(12) United States Patent
Shiobara et al.

(10) Patent No.: US 10,707,949 B2
(45) Date of Patent: Jul. 7, 2020

(54) COMMUNICATION SYSTEM, BASE STATION AND COMMUNICATION CONTROL METHOD

(71) Applicant: SoftBank Corp., Tokyo (JP)

(72) Inventors: Shota Shiobara, Tokyo (JP); Takao Okamawari, Tokyo (JP); Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 49 days.

(21) Appl. No.: 16/078,753

(22) PCT Filed: Jan. 26, 2017

(86) PCT No.: PCT/JP2017/002789
§ 371 (c)(1),
(2) Date: Aug. 22, 2018

(87) PCT Pub. No.: WO2017/145636
PCT Pub. Date: Aug. 31, 2017

(65) Prior Publication Data
US 2019/0089453 A1 Mar. 21, 2019

(30) Foreign Application Priority Data

Feb. 23, 2016 (JP) .................. 2016-031646

(51) Int. Cl.
*H04W 28/00* (2009.01)
*H04B 7/155* (2006.01)
(Continued)

(52) U.S. Cl.
CPC ....... *H04B 7/15592* (2013.01); *H04B 1/7102* (2013.01); *H04B 7/024* (2013.01);
(Continued)

(58) Field of Classification Search
CPC .. H04J 11/0053; H04L 5/0035; H04L 5/0073; H04W 28/18; H04W 36/30; H04W 72/12; H04W 92/20
See application file for complete search history.

(56) References Cited

U.S. PATENT DOCUMENTS

| 8,369,788 B2 | 2/2013 | Kim et al. |
| 2012/0108278 A1 | 5/2012 | Kim et al. |

(Continued)

FOREIGN PATENT DOCUMENTS

| EP | 2 639 969 A1 | 9/2013 |
| JP | 2012-178822 A | 9/2012 |

(Continued)

OTHER PUBLICATIONS

Baoshan Yan, et al., "Basic Design and implementation of a network control system for coordinated multipoint for joint transmission," Proceedings of the Society Conference of IEICE 2010, B-42.
(Continued)

*Primary Examiner* — Phuc H Tran
(74) *Attorney, Agent, or Firm* — Muirhead and Saturnelli, LLC

(57) ABSTRACT

A communication system, a base station and a communication control method are provided, which are capable of cooperatively transmitting data from a plurality of base stations to a plurality of communication terminals using a same radio resource. A first base station acquires a value of an interference suppression parameter that is applied to a transmission signal from the first base station so as to suppress interference from a second base station in a first communication terminal, when the first communication terminal locates in a cell border area. The second base station duplicates a desired data for a second communication terminal located in a cell of the second base station, and transmits the duplicated desired data to the first base station.

(Continued)

The first base station generates a transmission signal based on the value of the interference suppression parameter, the desired data for the first communication terminal, the desired data for the second communication terminal received from the second base station and a control information on data cooperative transmission, and the second base station generates a transmission signal of the desired data for the second communication terminal. Each of the base stations cooperatively transmits the transmission signal at a predetermined data cooperative transmission timing.

22 Claims, 12 Drawing Sheets

(51) Int. Cl.
*H04W 28/18* (2009.01)
*H04W 72/12* (2009.01)
*H04J 11/00* (2006.01)
*H04B 7/024* (2017.01)
*H04L 5/00* (2006.01)
*H04W 28/16* (2009.01)
*H04W 24/02* (2009.01)
*H04B 1/71* (2011.01)
*H04W 24/10* (2009.01)
*H04W 92/20* (2009.01)
*H04B 7/0452* (2017.01)
*H04W 36/30* (2009.01)

(52) U.S. Cl.
CPC ........ *H04J 11/0053* (2013.01); *H04L 5/0035* (2013.01); *H04L 5/0073* (2013.01); *H04L 5/0091* (2013.01); *H04W 24/02* (2013.01); *H04W 24/10* (2013.01); *H04W 28/16* (2013.01); *H04W 28/18* (2013.01); *H04W 72/12* (2013.01); *H04W 92/20* (2013.01); *H04B 7/0452* (2013.01); *H04W 36/30* (2013.01)

(56) References Cited

U.S. PATENT DOCUMENTS

| | | | |
|---|---|---|---|
| 2014/0256341 A1 | 9/2014 | Nazar et al. | |
| 2015/0117341 A1* | 4/2015 | Ohwatari | H04L 5/0032 370/329 |
| 2016/0006521 A1* | 1/2016 | Yoshimoto | H04W 8/24 375/267 |
| 2018/0220349 A1* | 8/2018 | Watanabe | H04W 16/32 |

FOREIGN PATENT DOCUMENTS

| | | |
|---|---|---|
| JP | 2013-187913 A | 9/2013 |
| JP | 5 796 832 B2 | 10/2015 |
| WO | WO 2015/170812 A1 | 11/2015 |

OTHER PUBLICATIONS

Texas Instruments, "On signaling for CoMP with non-ideal backhaul," 3GPP TSG-RAN WG1#76bis, R1-141605, Mar. 31-Apr. 4, 2014.

* cited by examiner

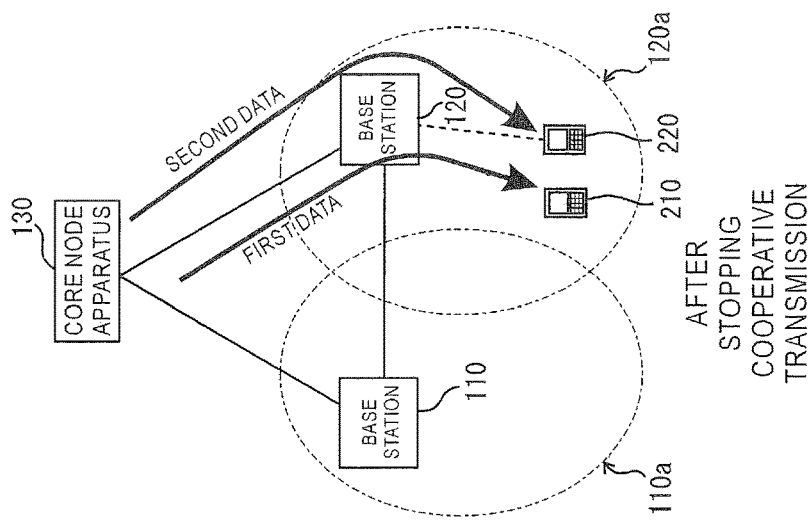
FIG. 3C AFTER STOPPING COOPERATIVE TRANSMISSION
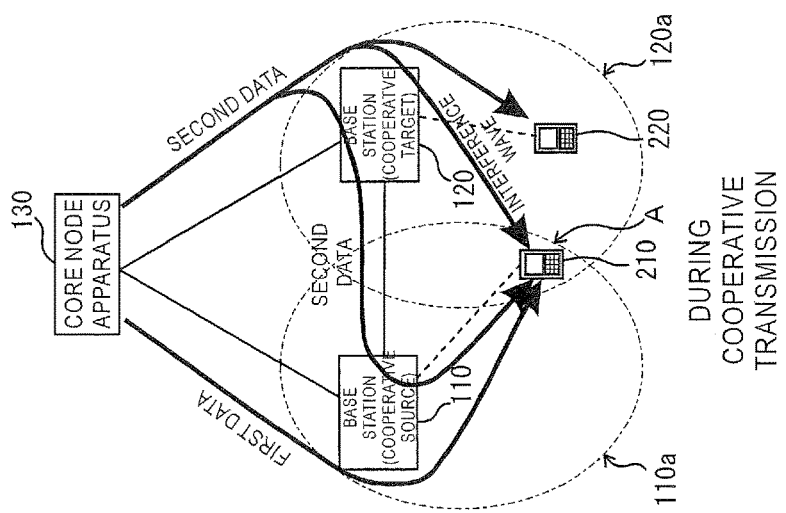
FIG. 3B DURING COOPERATIVE TRANSMISSION
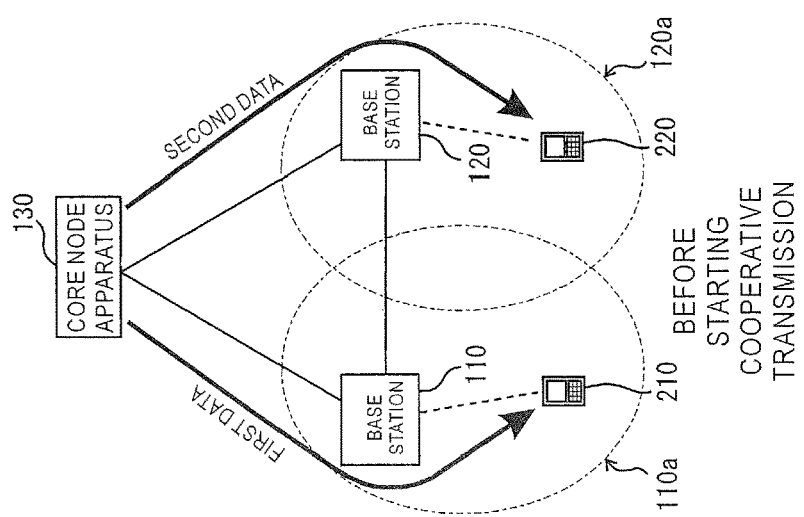
FIG. 3A BEFORE STARTING COOPERATIVE TRANSMISSION

COMMUNICATION SYSTEM, BASE STATION AND COMMUNICATION CONTROL METHOD

TECHNICAL FIELD

The present invention relates to a communication system in which a plurality of base stations can cooperatively transmit data to a communication terminal by radio communication, and a base station and a communication control method that can be used for the communication system.

BACKGROUND ART

There is conventionally known a communication system capable of cooperatively transmitting data from each of a plurality of base stations to one communication terminal by making one of the plurality of base stations function as a cooperative source base station, receiving data from a core node and distributing the data to another cooperative target base station, which is an anchor-type communication system of controlling the inter-base-station cooperative communication in an n autonomous and distributed manner by an inter-base station communication interface (reefer to Patent Literature 1 and Non-Patent Literature 1). According to this anchor-type communication system, it is said that it is capable of realizing an improvement of throughput, an enhancement of communication quality, an effective utilization of communication band, etc. in a cell border area where a plurality of radio communication areas (cells) of base stations overlaps, surely performing a management of cooperative resources in the plurality of base stations, and enhancing an efficiency of cooperative transmission from the plurality of base stations.

CITATION LIST

Patent Literature

Patent Literature 1: Japanese Unexamined Patent Application Publication No. 2012-178822.

Non-Patent Literature

Non-Patent Literature 1: Yan Baoshan, Takao Okamawari, Hideki Hayashi, "Basic Design and implementation of network control system for cooperative transmission between a plurality of base stations", Proceedings of the 2010 Society Conference of the Institute of Electronics, Engineers, p. 119.

SUMMARY OF INVENTION

Technical Problem

In the anchor-type communication system, there is a problem that it is desired to suppressing an interference in a communication terminal located in a cell border area and to cooperatively transmit a data from a plurality of base stations to a plurality of communication terminals including the communication terminal by using a same radio resource.

The present invention has been made in view of the above described problem and an objective is to provide a communication system, a base station and a communication control method which are capable of suppressing an interference in a communication terminal located in a cell border area, and capable of cooperatively transmitting a data from a plurality of base stations to a plurality of communication terminals including the foregoing communication terminal by using a same radio resource.

Solution to Problem

A communication system according to an aspect of the present invention is a communication system capable of cooperatively transmitting a data from a first base station and a second base station by radio communication. The first communication terminal acquires a value of an interference suppression parameter that is applied to a transmission signal from the first base station so as to suppress an interference from the second base station in a first communication terminal, when the first communication terminal having the first base station as a desired station locates in a cell border area between a cell of the first base station and a cell of the second base station. The second base station duplicates a desired data for a second communication terminal located in a cell of the second base station and having the second base station as a desired station, and transmits the duplicated desired data to the first base station via an inter-base-station communication interface. The first base station generates a transmission signal by applying the value of the interference suppression parameter to a desired data for the first communication terminal and the desired data for the second communication terminal received from the second base station. The second base station generates a transmission signal of the desired data for the second communication terminal. Each of the first base station and the second base station cooperatively transmit the generated transmission signal at a predetermined data cooperative transmission timing.

In the foregoing communication system, the first base station may transmit a cooperative transmission start request to the second base station, receive a cooperative transmission start response including information on a vacant radio communication resource from the second base station that receives the cooperative transmission start request, determine a cooperative resource to be used for a data cooperative transmission in each of the first base station and the second base station based on the cooperative transmission start response, and transmit a cooperative transmission start notification including information on the determined cooperative resource to the second base station. The second base station may transmit to the first base station the cooperative transmission start response including the information on the vacant radio communication resource that is a candidate of the cooperative resource, and receive the cooperative transmission start notification including the information on the determined cooperative resource from the first base station that receives the cooperative transmission start response.

Furthermore, in the foregoing communication system, the first base station may transmit to the second base station a cooperative transmission start request including information on a vacant resource to be a candidate of the cooperative resource, and receive a cooperative transmission start response including an available radio resource among the information on the vacant resource to be the candidate of the cooperative resource from the second base station that receives the cooperative transmission start request, determine a cooperative resource used for a data cooperative transmission in each of the first base station and the second base station based on the cooperative transmission start response, and transmit to the second base station a cooperative transmission start notification including the information on the determined cooperative resource. The second base station may select the available radio resource among the information on the vacant resource information to be the candidate of the cooperative resource candidate including the cooperative transmission start request received from the first base station, transmit the cooperative transmission start response including the available radio resource, and receive the cooperative transmission start notification including the information on the determined cooperative resource from the first base station that receives the cooperative transmission start response.

Moreover, in the foregoing communication system, the first base station may lend the cooperative resource capable of performing a remote control from the second base station. The second base station may remotely control the desired data for the second communication terminal, which is transmitted to the first base station via the inter-base station communication interface, by using the cooperative resource borrowed from the first base station, and transmit the desired data from the first base station to the first communication terminal.

Further, in the foregoing communication system, the second base station may select a communication terminal to which a transmission signal with weakest interference for the first communication terminal is transmitted from the second base station, among a plurality of communication terminals located in a cell of the second base station, as the second communication terminal. Herein, the second base station may select the second communication terminal based on location information on the plurality of communication terminals located in the cell of the second base station.

Furthermore, in the foregoing communication system, the second base station may acquire a value of an interference suppression parameter to be applied to a transmission signal from the second base station so as to suppress an interference from the first base station in the second communication terminal, when the second communication terminal locates in the cell border area. The first base station may duplicate a desired data for the first communication terminal and transmit the duplicated desired data to the second base station via the inter-base station communication interface. The second base station may generate a transmission signal by applying the value of the interference suppression parameter to a desired data for the second communication terminal and the desired data for the first communication terminal received from the first base station.

Moreover, in the foregoing communication system, the first base station may calculate and acquire the value of the interference suppression parameter used in the first base station based on quality information on a radio signal received from the first communication terminal.

Further, in the foregoing communication system, the first communication terminal may calculate the interference suppression parameter based on quality information on a radio signal received by the first communication terminal itself, and transmit the calculated interference suppression parameter to the first base station.

Furthermore, in the foregoing communication system, the second base station may calculate and acquire the value of the interference suppression parameter used in the second base station based on quality information on a radio signal received from the second communication terminal.

Moreover, in the foregoing communication system, the second communication terminal may calculate the interference suppression parameter based on quality information on a radio signal received by the second communication terminal itself, and transmit the calculated interference suppression parameter to the second base station.

Further, in the foregoing communication system, the first base station may receive quality information on a radio signal received from the second communication terminal, from the second base station via the inter-base station communication interface, calculate a value of the interference suppression parameter used in the first base station and the second base station based on quality information on the radio signal received from the first communication terminal and quality information on the radio signal received from the second base station, and transmit the value of the interference suppression parameter used in the second base station to the second base station via the inter-base station communication interface. The second base station may transmit the quality information on the radio signal received from the second communication terminal to the first base station via the inter-base station communication interface, receive the value of the interference suppression parameter used in the second base station from the first base station via the inter-base station communication interface.

Furthermore, in the foregoing communication system, the second base station may receive the quality information on the radio signal received from the first communication terminal, from the first base station via the inter-base station communication interface, calculate a value of the interference suppression parameter used in the first base station and the second base station based on the quality information on the radio signal received from the second communication terminal and the quality information on the radio signal received from the first base station, and transmit the value of the interference suppression parameter to use in the first base station to the first base station via the inter-base station communication interface. The first base station may transmit the quality information on the radio signal received from the first communication terminal to the second base station via the inter-base station communication interface, receive the value of the interference suppression parameter used in the first base station from the second base station via the inter-base station communication interface.

Moreover, in the foregoing communication system, each of the first base station and the second base station may perform the cooperative transmission with a MIMO (Multi Input Multi Output) transmission system that uses a plurality of antennas, and the interference suppression parameter may be a transmission weight.

Further, in the foregoing communication system, when the first base station determines that the first communication terminal locates in the cell border area based on the quality information on the radio communication received from the communication terminal located in the cell of the first base station, the first base station may determine a start of the data cooperative transmission for the first communication terminal and the second communication terminal, and transmit the cooperative transmission start request for requiring the cooperative transmission of the data to the second base station via the inter-base station communication interface.

A base station according to another aspect of the present invention is any one of a plurality of base stations in a communication system capable of cooperatively transmitting a data from the plurality of base stations by radio communication. The base station comprises means of acquiring a value of an interference suppression parameter that is applied to a transmission signal from an own base station so as to suppress an interference from another base station in a first communication terminal, when the first communication terminal having the own base station as a desired station locates in a cell border area between an own cell and a cell of another base station that performs a cooperative transmission of the data, means of generating a transmission signal by applying the value of the interference suppression parameter to a desired data for the first communication terminal and a desired data for a second communication terminal located in the cell of the other base station which is received from the other base station, and means of cooperatively transmitting the generated transmission signal at a predetermined data cooperative transmission timing.

In the foregoing base station, the base station may comprise means to duplicating a desired data for the first communication terminal and transmitting the duplicated desired data to the other base station via inter-base station communication interface.

A base station according to still another aspect of the present invention is any one of a plurality of base stations in a communication system capable of cooperatively transmitting data from the plurality of base stations by radio communication. The base station comprises means duplicating a desired data for a second communication terminal having an own base station as a desired station located in an own cell and transmitting the duplicated desired data to another base station performing a cooperative transmission of the data via inter-base station communication interface, means of generating a transmission signal of the desired data for the second communication terminal, means of cooperatively transmitting the generated transmission signal at a predetermined data cooperative transmission timing.

In the foregoing base station, the base station may comprise means of acquiring a value of an interference suppression parameter that is applied to a transmission signal from an own base station so as to suppress an interference from the other base station in the second communication terminal, when the second communication terminal locates in a cell border area between an own cell and a cell of the other base station, and means of generating a transmission signal by applying the value of the interference suppression parameter to a desired data for the second communication terminal and a desired data received from the other base station for a first communication terminal having the other base station as a desired station.

A communication control method according to still another aspect of the present invention is a communication control method when cooperatively transmitting a data from a first base station and a second base station by radio communication. The method comprises acquiring a value of an interference suppression parameter that is applied to a transmission signal from the first base station so as to suppress an interference from the second base station in a first communication terminal, by the first base station, when the first communication terminal having the first base station as a desired station locates in a cell border area between a cell of the first base station and a cell of the second base station, duplicating a desired data for a second communication terminal having the second base station as a desired station located in a cell of the second base station, and transmitting the duplicated desired data to the first base station via inter-base station communication interface, by the second base station, generating a transmission signal by applying the value of the interference suppression parameter to a desired data for the first communication terminal and a desired data for the second communication terminal received from the second base station, by the first base station, generating a transmission signal of the desired data for the second communication terminal by the second base station, and cooperatively transmitting the generated transmission signal at a predetermined data cooperative transmission timing by each of the first base station and the second base station.

In the foregoing communication control method, the method may comprise acquiring a value of an interference suppression parameter that is applied to a transmission signal from the second base station so as to suppress an interference from the first base station in the second communication terminal, by the second base station, when the second communication terminal locates in the cell border area, and duplicating a desired data for the first communication terminal, and transmitting the duplicated desired data to the second base station via the inter-base station communication interface, by the first base station, and generating a transmission signal by applying the value of the interference suppression parameter to the desired data for the second communication terminal and the desired data for the first communication terminal received from the first base station, by the second base station.

Advantageous Effects of Invention

According to the present invention, it is capable of cooperatively transmitting a data from a plurality of base stations to a plurality of communication terminals by using a same radio resource.

BRIEF DESCRIPTION OF DRAWINGS

FIG. 3A is an illustration showing an example of a communication before starting the cooperative transmission of the communication system.

FIG. 3B is an illustration showing an example of a communication during the cooperative transmission of the communication system.

FIG. 3C is an illustration showing an example of a communication after stopping the cooperative transmission of the communication system.

DESCRIPTION OF EMBODIMENTS

Hereinafter, various embodiments of the present invention will be described with reference to the drawings.

Figure 1:
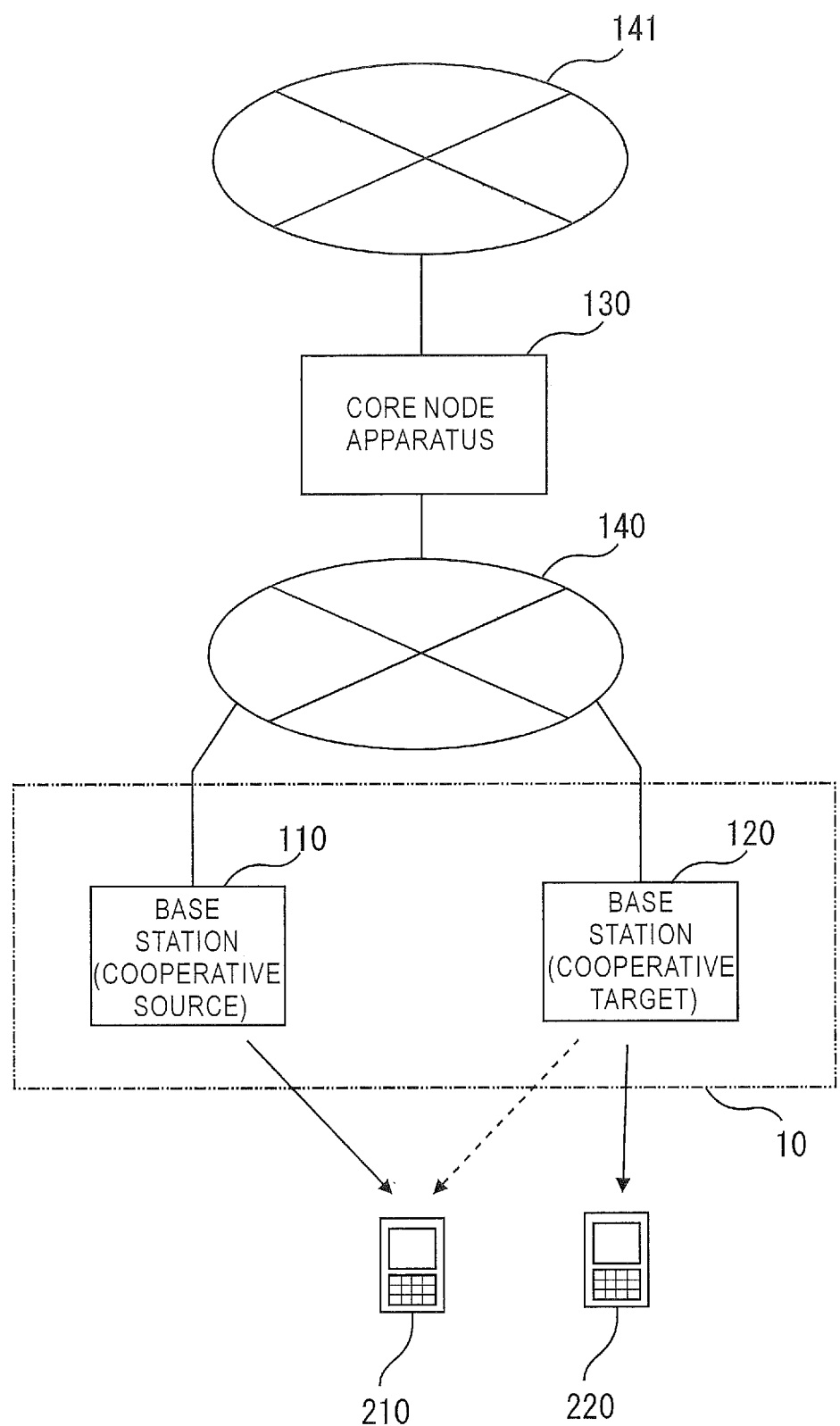
FIG. 1 is an illustration showing one example of a configuration of a communication system according to an embodiment of the present invention.

FIG. 1 is an illustration showing one example of a configuration of a communication system according to embodiment of the present invention. The communication system 10 of the present embodiment includes a first base station 110 and a second base station 120 being as a plurality of radio base station apparatus, which are mutually synchronized in time by GPS, etc. These base stations 110 and 120 are capable of transmitting with each other via a wired or wireless communication link being as inter-base station communication interface, and capable of cooperatively transmitting a desired data for cooperative transmission object respectively to a communication terminal (hereinafter called as "terminal") 210 located in a cell border area (hereinafter also called as "cell") where radio communication areas of the base stations 110 and 120 are overlapped and to a terminal 220 located in a cell of the base station 120, by cooperating with each other. A MIMO (Multi Input Multi Output) transmission system with a plurality of antennas is used for the cooperative transmission to each of the terminals 210 and 220, and it can be realized to improve at a communication time by each terminal 210 and 220, improve a communication quality and effectively use a frequency band.

It is noted that, although the present embodiments will be described by assuming the LTE (Long Term Evolution) as a radio technology, the embodiments can be applied even in case of assuming another radio technology such as the LTE-Advanced or 5G, etc.

It is also noted that, although the present embodiments will be described in case of the number of the plurality of base stations capable of cooperatively transmitting with each other is two, the number of the plurality of base stations may be three or more. Furthermore, although the present embodiments will be described in case of two terminals receive a plurality of data cooperatively transmitted from the plurality of base stations, the number of terminals receiving the plurality data cooperatively transmitted may be a plurality of three or more.

In FIG. 1, the first base station 110, which is one of the plurality of the base stations 110 and 120, is a cooperative source base station having a function of controlling by determining a cooperative transmission start of data from each of the base stations. The other base station 120 is a cooperative target base station in which the cooperative transmission start of data is controlled by the cooperative source base station 110. These base stations 110 and 120 may be called as a "Node B" in the specifications of 3GPP (Third Generation Partnership Project), and also sometimes called as an "eNode B (evolved Node B)" being as an evolved Node B in the specifications of LTE. The cooperative source base station may be sometimes called as an anchor base station or master base station, and the cooperative target base station may be sometimes called as a slave base station.

The communication system 10 may include a core node apparatus (hereinafter called as "core node") 130 that distributes data as cooperative transmission target data to the plurality of base stations 110 and 120. The core node 130 is, for example, an EPC (Evolved Packet Core) in the LTE, and capable of communicating with an external network via a data communication network 141. The core node 130 and the plurality of base stations 110 and 120 are connected 120 via a data communication network 140 such as a packet network. The communication system 10 may include the data communication network 140. The communication system 10 may also include the terminals 210 and 220 capable of receiving a plurality of data cooperatively transmitted from the plurality of base stations 110 and 120. The terminals 210 and 220 may be called as user equipment (UE: User Equipment) as they are used by users of communication service, sometimes called as a mobile apparatuses since they are movable, and further sometimes called as radio devices.

The terminals 210 and 220 may be mobile communication terminals such as portable telephones, etc. and the network configured with the base stations 110 and 120 and the data communication network 140, etc. may be a cellular network of a mobile communication network. The data communication network 141 may be an external network such as the Internet or an IMS (IP multimedia subsystem). Each of radio communication areas of the base stations 110 and 120 may be any one of various cells that are different in size from each other, such as a macro cell, a micro cell, a femto cell, a pico cell or the like.

One of the plurality of base stations 110 and 120 capable of radio communicating with the terminals 210 and 220 is a cooperative source base station having a function of performing a determination and control to start and stop the cooperative transmission operation for cooperatively transmitting data from the plurality of base stations 110 and 120. Another base station other than the cooperative source base station is a cooperative target base station being as a cooperated base station that is controlled so as to being cooperatively operated by the cooperative source base station. The base stations 110 and 120 may be capable of having both of the functions as the cooperative source base station and the cooperative target base station, and may optionally become the cooperative source base station or the cooperative target base station for each of the terminals depending on the state of each terminal.

In the present embodiment, the cases in which the OFDMA (Orthogonal Frequency Division Multiple Access) system is used as a radio communication system between the base stations 110 and 120 and the terminals 210 and 220 will be described.

Figure 2:
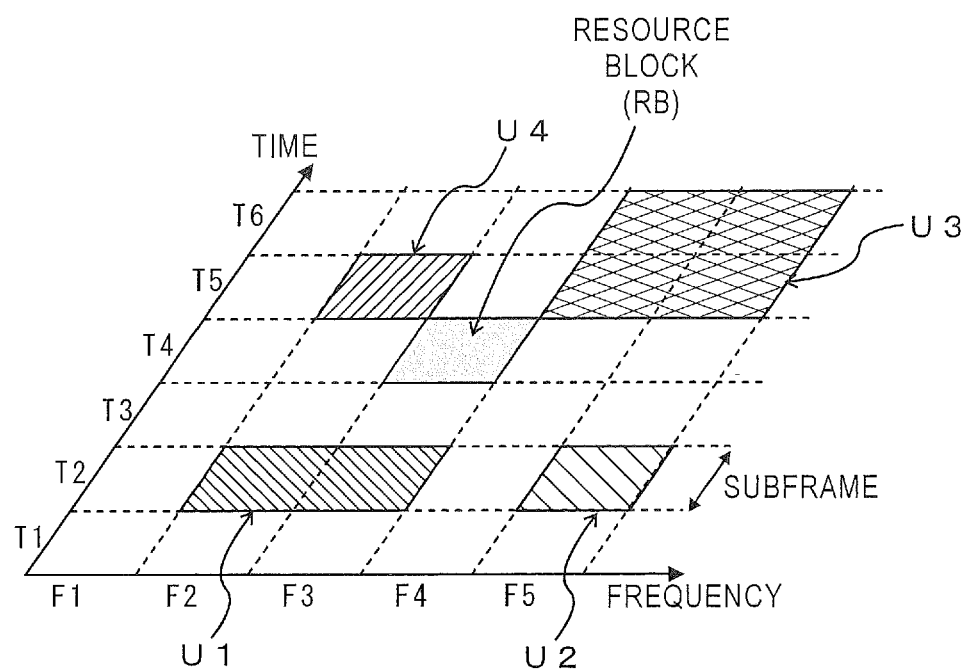
FIG. 2 is an illustration showing an example of an allocation of cooperative resources of a communication system according to the embodiment.

FIG. 2 is an illustration showing an example of a concept of a radio resource in the OFDMA system. As illustrated in the figure, when adopting the OFDMA system, radio resources are allocated by designating frequencies (F1, F2, F3, . . . ) with a predetermined frequency band as one unit, and time of transmission timings (T1, T2, T3, . . . ) with a subframe of a predetermined time width as one unit. For example, in the example illustrated in the figure, radio resources with 2 blocks designated by frequencies F2 and F3 and a time T2 are allocated for the terminal of user U1, and a radio resource with 1 block designated by a frequency F5 and a time T2 is allocated for the terminal of user U2. Moreover, radio resources with 4 blocks designated by frequencies F4 and F5 and times T5 and T6 are allocated for the terminal of user U3, and a radio resource with 1 block designated by a frequency F2 and a time T5 is allocated for the terminal of user U4. It is noted that, in the present embodiment, although the communication system using the OFDMA system is described, the present invention can be similarly applied to a communication system using a radio communication system other than the OFDMA system.

In the present embodiment, following the general LTE implementation, each of base-station apparatuses manages radio resources in a cell that is a radio management area. In the example of FIG. 3 described below, the first base station 110 manages radio resources of a cell 110a and the second base station 120 manages radio resources of a cell 120a. Accordingly, in case that the first base station 110 communicates with the terminal 210 using a radio resource F1/T1 in FIG. 2, when the second base station 120 communicates with the terminal 220 using the same radio resource F1/T1, if the terminal 210 moves into a cell border area A, a communication quality of downlink signal of the terminal 210 is deteriorated by an occurrence of interference (refer to FIG. 3B as described below). Therefore, in case that the first base station 110 communicates with the terminal 210 using the F1/T1, although the interference can be suppressed by the second base station 120 communicating with the terminal 220 using the different radio resource F2/T2, a utilization efficiency of the radio resources is degraded since 2 blocks of radio resource F1/T1 and radio resource F2/T2 are required. Accordingly, a cooperative transmission system in which the base station 110 and the base station 120 uses the same radio resource F1/T1 and communicate simultaneously without deteriorating communication quality is required.

Hereinafter, in the present embodiment, the cases in which an inter-base station cooperative MU-MIMO is used as such a cooperative transmission system will be described. It is noted that, in the present embodiment, although a communication system using an inter-base station cooperative MU-MIMO will be described, the present invention can be similarly applied to a communication system using a cooperative transmission system other than the inter-base station cooperative MU-MIMO.

FIG. 3A, FIG. 3B and FIG. 3C are respectively an illustration showing a communication before starting the cooperative transmission, during the cooperative transmission and after stopping the cooperative transmission in the communication system 10 according to the present embodiment. Before starting the cooperative transmission shown in FIG. 3A, the terminal 210 as a first communication terminal locates in the cell 110a that is a radio management area of the first base station 110. When the first base station 110 receives a transmission target data from the core node 130, the first base station 110 transmits a radio-wave transmission signal generated with respect to the data to the terminal 210 in the first cell 110a using the radio resource of the first cell 110a. The terminal 220 as a second communication terminal locates in the cell 120a that is a radio management area of the second base station 120. When the second base station 120 receives a transmission target data from the core node 130, the second base station 120 transmits a radio-wave transmission signal generated with respect to the data to the terminal 220 in the second cell 120a using the radio resource of the second cell 120a.

As shown in FIG. 3A, if the terminal 210 and the terminal 220 are sufficiently far from the cell border area A between the cell 110a and the cell 120a, even when the base station 110 and the base station 120 transmit the signals to the terminal 210 and the terminal 220 using the same radio resource (for example, in the above-mentioned case of OFDMA, in the same frequency and at the same time), the communication can be independently performed for each of the cells, since the signal (interference wave) received by the terminal 210 from the base station 120 and the signal (interference wave) received by the terminal 220 from the base station 110 are sufficiently small and can be neglected.

However, as shown in FIG. 3B, when the terminal 210 moves and enters into the cell border area A, the signal (interference wave) received by the terminal 210 from the base station 120 becomes non-negligible and deteriorates communication property of the terminal 210. Therefore, the base station 110 and the base station 120 start a cooperative communication using the inter-base station cooperative MU-MIMO, the communication property of the terminal 210 is improved by suppressing the signal (interference wave) received by the terminal 210 from the base station 120, the base station 120 continues a communication with the terminal 220 using the same radio resource as the cooperative transmission (for example, in the above-mentioned case of OFDMA, in the same frequency and at the same time).

Furthermore, as shown in FIG. 3C, when the terminal 210 determines to move into the cell 120a that is a radio management area of the base station 120, the terminal 210 performs a handover from the base station 110 to the base station 120 and terminates the cooperative transmission.

Hereinafter, the details with respect to processing procedures when starting the cooperative transmission, processing procedures during the cooperative transmission and processing procedures when terminating the cooperative transmission will be described using the present examples.

Figure 4:
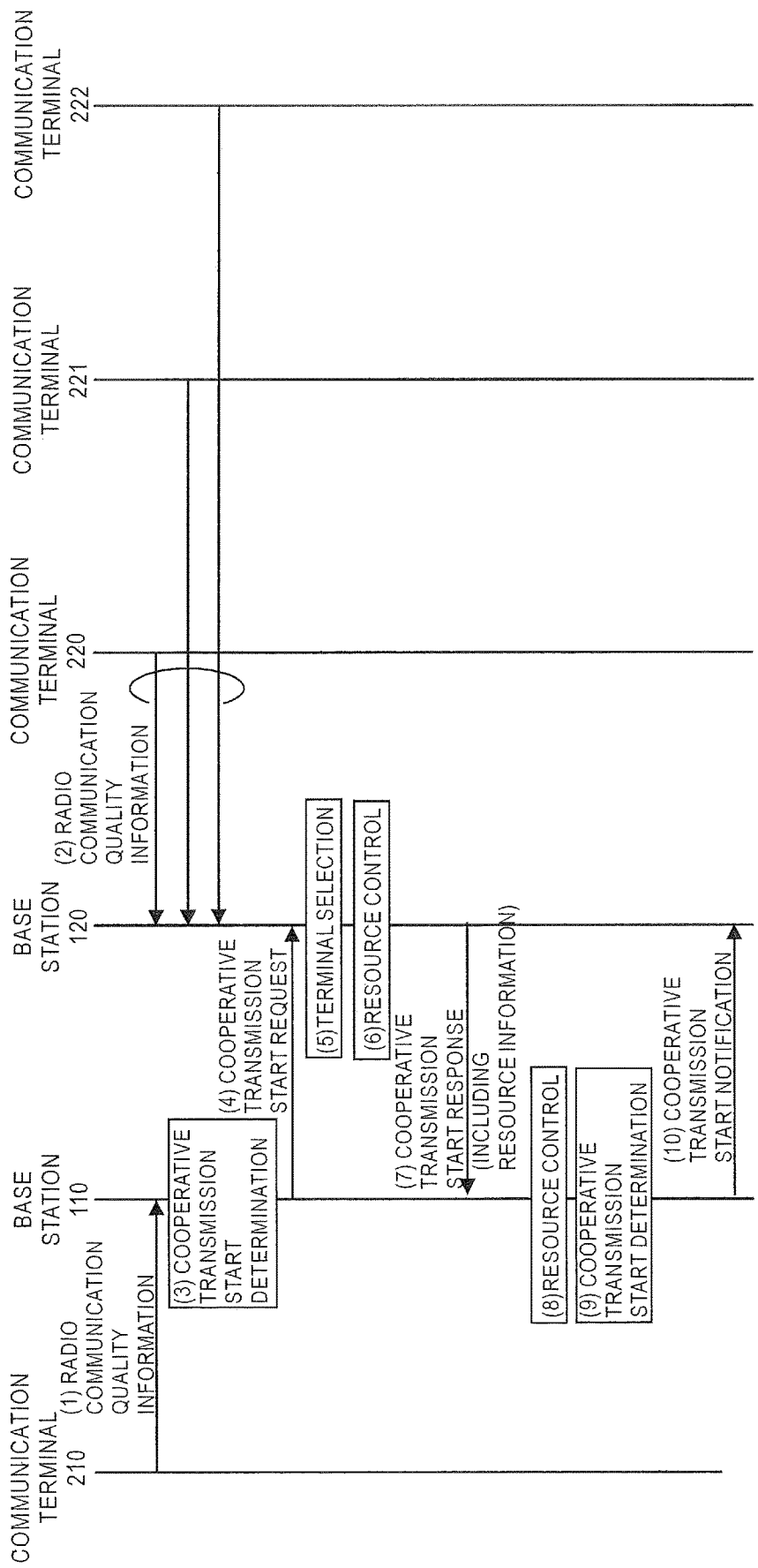
FIG. 4 is a sequence diagram showing an example of a communication control before starting the cooperative transmission of the communication system according to the embodiment.

FIG. 4 is a sequence diagram showing an example of processing procedures when staring the cooperative transmission at the transition timing from the state of FIG. 3A to the state of FIG. 3B. It is noted that, the numbers shown in parentheses in the figure are indicating the order of control steps for convenience. Moreover, although the example of FIG. 4 indicates an example of one terminal 210 located in the cell 110a of the first base station 110 and three terminals 220, 221 and 222 located in the cell 120a of the second base station 120, the number of terminals located in each of the cells is not limited to those shown in the figure.

In FIG. 4, when a normal transmission of transmitting data to the terminal 210 located in the cell 110a of the base station 110 is performed via the first base station 110 from the core node 130, the terminal 210 measures a received signal strength of radio wave from neighboring base stations including the first base station 110 and the second base station 120, and transmits the received signal strength to the first base station 110 as quality information on the radio communication (hereinafter appropriately called as "radio communication quality information", also called "Measurement Report" in the LTE) (STEP 1).

Similarly, when a normal transmission of transmitting data to the plurality of terminals 220, 221 and 222 located in the cell 120a of the base station 120 is performed via the second base station 120 from the core node 130, each of the terminals 220, 221 and 222 measures a received signal strength of radio wave from neighboring base stations including the first base station 110 and the second base station 120, and transmits the received signal strength to the second base station 120 as radio communication quality information (STEP 2).

When a difference of the received signal strength of the radio wave between the first base station 110 and the neighboring second base station 120 based on the radio communication quality information received from the terminal 210 is equal to or lower than a predetermined threshold value (cooperative transmission start threshold), the base station 110 determines the terminal 120 locates in the cell border area A in which both of the cells 110*a* and 120*a* of base stations 110 and 120 are overlapped, determines a start of the cooperative transmission using the inter-base station cooperative MU-MIMO to prevent the interference wave (STEP 3), and transmits the cooperative communication start request to the second base station 120 (STEP 4). At this time, the first base station 110 functions as the cooperative source base station for the terminal 210 and the second base station 120 functions as the cooperative target base station.

It is noted that, the functions of the cooperative source base station and the cooperative target base station are not predetermined for each of the base stations. For example, when the terminal 220 located in the cell of the second base station 120 moves into the cell border area A and starts the cooperative communication, the second base station 120 becomes the cooperative source base station that determines the start of the cooperative transmission for the terminal 220, and the first base station 110 becomes the cooperative target base station. In this manner, each of the base stations 110 and 120 is capable of having both functions of the cooperative source base station and the cooperative target base station for each of the terminals.

When receiving the cooperative communication start request from the first base station 110, the second base station 120 selects the terminal 210 and another terminal that performs the cooperative transmission using the inter-base station cooperative MU-MIMO, among the terminals 220, 221 and 222, based on the radio communication quality information received from each of the terminals 220, 221 and 222 located in the cell 120*a* of the second base station 120 (STEP 5). As a cooperative data transmission target terminal that performs a cooperative transmission using the inter-base station cooperative MU-MIMO, for example, a terminal having the weakest interference signal that is transmitted from the second base station 120 to the terminals 220, 221 and 222 and reaches the terminal 210 in the cell boundary area A is selected. By thus selecting the terminal with the weakest interference signal, it is capable of surely reducing the inter-base station interference in the terminal 210 located in the cell border area A at the time of the cooperative data transmission. It is noted that, location information on the terminal 220, 221 and 222 acquired by the GPS, etc. may be used for the selection of the terminal. In the present example, the terminal 220 is selected as a terminal that performs the cooperative transmission with the terminal 210 by the inter-base station cooperative MU-MIMO.

Next, the second base station 120 checks the radio resource (vacant resource) available for the data cooperative transmission, determines the vacant resource as a candidate of a cooperative resource, and performs a resource control for using the vacant resource at the time of the cooperative data transmission (STEP 6). The second base station 120 sends back a cooperative transmission start response for responding to the cooperative transmission start request to the first base station 110, together with the resource information on the vacant resource (STEP 7).

The first base station 110 determines the cooperative resource used for the cooperative transmission of the inter-base station cooperative MU-MIMO based on the vacant resource information received from the second base station 120, and performs a resource control for lending the cooperative resource to the second base station 120 so as to remotely controlling the cooperative resource from the second base station 120 (STEP 8). After that, the first base station 110 determines the start of the cooperative transmission of the inter-base station cooperative MU-MIMO in which the own base station functions as the cooperative source base station and the second base station 120 functions as the cooperative target base station (STEP 9). Then, in order to inform the second base station 120 of the start of the cooperative transmission of the inter-base station cooperative MU-MIMO, the first base station 110 transmits a cooperative transmission start notification to the second base station 120 together with the information on the determined cooperative resource used for the cooperative transmission (STEP 10). The second base station 120, which receives the cooperative transmission start notification, performs a resource control setting so as to use the cooperative resource of the own base station for the cooperative transmission of the inter-base station cooperative MU-MIMO to the terminal 220, and performs a resource control setting to use the cooperative resource borrowed from the first base station 110 by remotely controlling for the cooperative transmission of the inter-base station cooperative MU-MIMO to the terminal 210.

Figure 5:
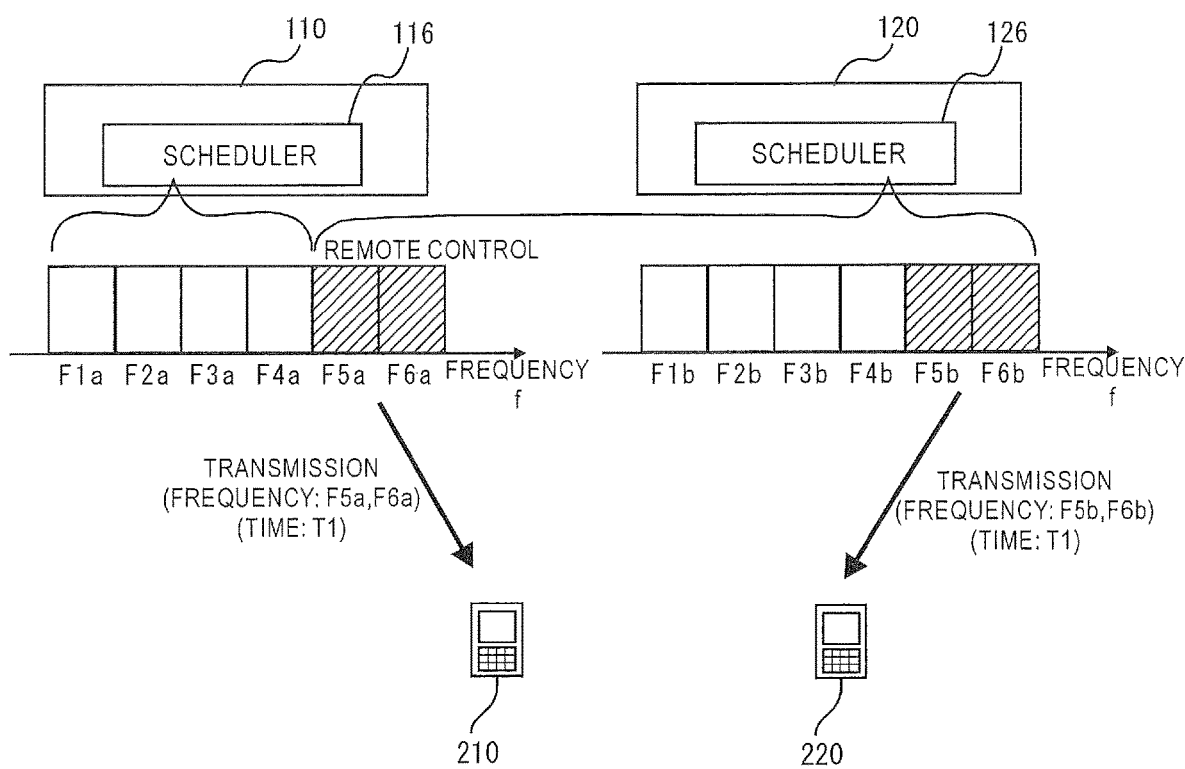
FIG. 5 is an illustration showing an example of a concept of lending and borrowing of resources in the data cooperative transmission of the communication system according to the embodiment.

FIG. 5 is an illustration showing an example of a concept of lending and borrowing of a cooperative resource during the data cooperative transmission. In FIG. 5, the cooperative source base station (the first base station) 110 allocates frequency resources F5*a* and F6*a* of the own base station as the cooperative resource, and lends the frequency resources F5*a* and F6*a* to the cooperative target base station 120. The cooperative resources (frequency resources F5*a* and F6*a*) in the cooperative source base station 110 are used for transmitting a desired data (first data) from the own base station to the terminal 210 at the timing of the cooperative transmission of the inter-base station cooperative MU-MIMO, and used for transmitting a data transferred to the base station 110 by the inter-base station communication interface, which is a desired data (second data) from the cooperative target base station 120 to the terminal 220. However, the cooperative resources (frequency resources F5*a* and F6*a*) in the cooperative source base station 110 are not controlled by a scheduler 116 of the cooperative source base station 110, and remotely controlled by a scheduler 126 of the cooperative target base station 120. Therefore, while the cooperative transmission of the inter-base station cooperative MU-MIMO is performed, the scheduler of the cooperative source base station 110 cannot use the cooperative resource for data transmission from the cooperative source base station 110 to other terminals than the terminal 210.

The cooperative target base station (the second base station) 120 borrows the frequency resources F5*a* and F6*a* from the cooperative source base station 110 as the cooperative resource, and allocates frequency resources F5*b* and F6*b* of the own base station, which are the same frequency resources as the frequency resources F5*a* and F6*a*. As described above, the frequency resources F5*a* and F6*a* borrowed from the cooperative source base station 110 are used for the transmission of the first data from the cooperative source base station 110 to the terminal 210 at the time of cooperative transmission of the inter-base station cooperative MU-MIMO and the transmission of the second data transferred from the own base station. The cooperative resources (frequency resources F5b and F6b) in the cooperative target base station 120 are used for the transmission of the second data as the desired data from the own base station to the terminal 220 at the time of cooperative transmission of the inter-base station cooperative MU-MIMO. The cooperative resources (frequency resources F5b and F6b) in the cooperative target base station 120 are controlled by the scheduler 126 of the cooperative target base station 120, while the cooperative transmission of the inter-base station cooperative MU-MIMO is performed, the cooperative resources cannot be used for a data transmission from the cooperative target base station 120 to other terminals than the terminal 220. The cooperative source base station 110 and the cooperative target base station 120 perform a cooperative transmission of the inter-base station cooperative MU-MIMO at the same time (data cooperative transmission timing, for example, T1), by using the same frequencies F5 and F6 determined by the above-mentioned resource control. Therefore, the cooperative source base station 110 and the cooperative target base station 120 are capable of performing a cooperative transmission of the inter-base station cooperative MU-MIMO to the terminals 210 and 220 without negotiating resources with each other during the cooperative transmission.

Figure 6:
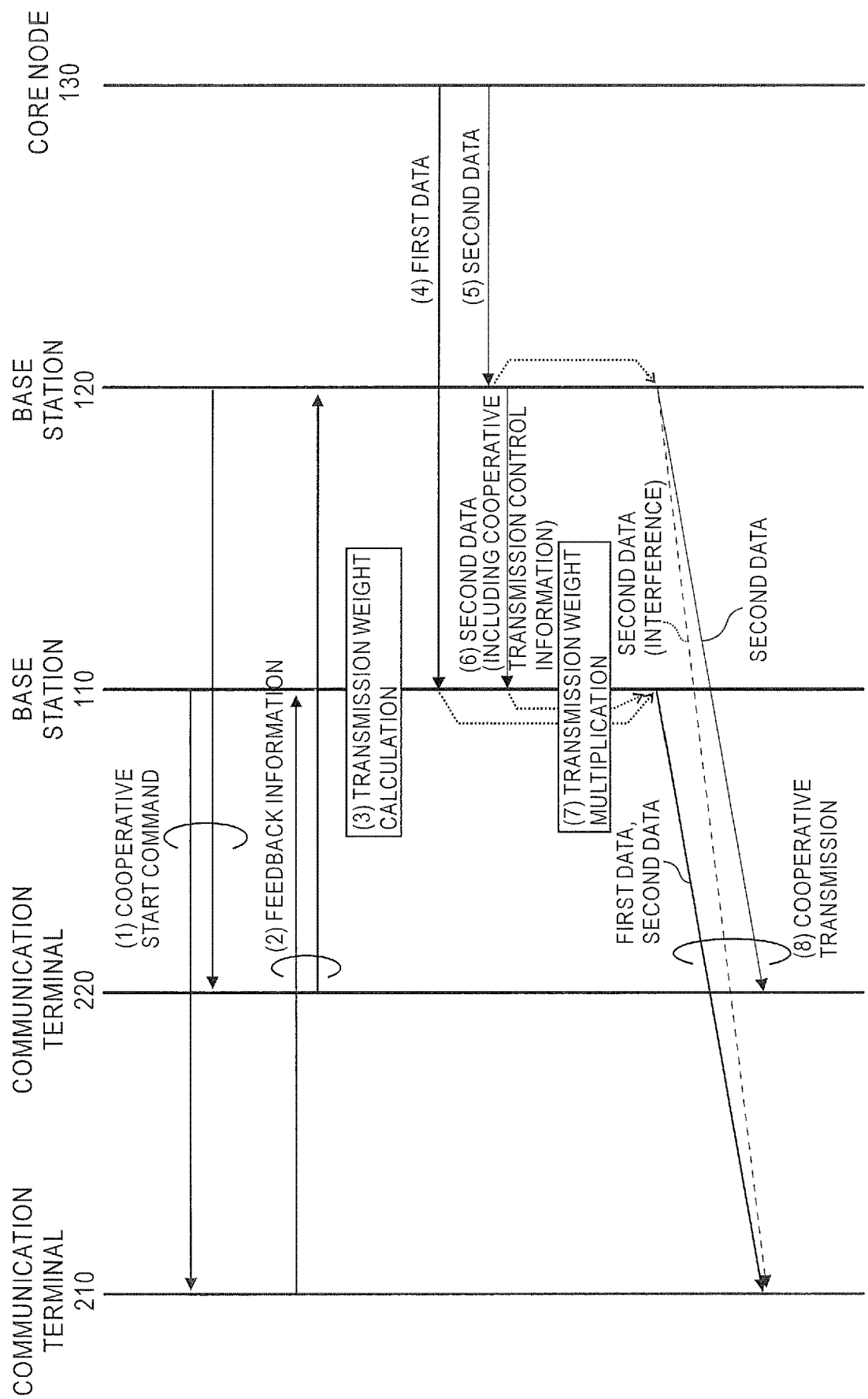
FIG. 6 is a sequence diagram showing an example of a communication control during a data cooperative transmission of the communication system according to the embodiment.

FIG. 6 is a sequence diagram showing an example of a processing procedure during the cooperative transmission showing in FIG. 3B. In FIG. 6, after transmitting and receiving the cooperative transmission start notification from the cooperative source base station 110 to the cooperative target base station 120, the cooperative source base station 110 transmits a cooperative start command to the terminal 210 in the cell border area A (STEP 1), and the cooperative target base station 120 transmits the cooperative start command to the selected terminal 220 located in an own cell (STEP 1).

Upon receiving the cooperative transmission start command from the cooperative source base station 110, the terminal 210 becomes a state capable of processing the cooperative transmission data by activating the cooperative transmission processing by starting a predetermined cooperative transmission program for processing a data cooperatively transmitted from the base station 110, and transmits feedback information (also called "CSI feedback" in the LTE) including a propagation channel state (CSI: Channel State Information) of the downlink from the cooperative source base station 110 and the cooperative target base station 120 to the base station 110 (STEP 2). Moreover, upon receiving the cooperative transmission start command from the cooperative target base station 120, the terminal 220 becomes a state capable of processing the cooperative transmission data by activating a predetermined cooperative transmission program for processing data transmitted from the base station 120 and starting a cooperative transmission process, and transmits feedback information including a propagation channel state (CSI) of the downlink from the cooperative source base station 110 and the cooperative target base station 120 to the base station 120 (STEP 2).

Upon receiving the feedback information from the terminal 210, the cooperative source base station 110 calculates a value of "transmission weight" (also called "Precoding Matrix" in the 3GPP specification) as an interference suppression parameter that is applied to the data to be transmitted to the terminal 210 by the MIMO transmission system at the time of data cooperative transmission (STEP 3). The transmission weight is a weighting factor consisting of a complex number that is multiplied by a transmission signal transmitted from each of the plurality of transmission antennas in the MIMO transmission system. For example, the value of the transmission weight is calculated so that the transmission signal transmitted from the cooperative source base station 110 to the terminal 210 of the cell border area A becomes opposite in phase to the transmission signal (interference wave) of the second data transmitted from the cooperative target base station 120 in the terminal 210 of the cell border area A. By using this transmission weight, the interference wave is suppressed in the terminal 210 of the cell border area A, and the communication quality of the downlink signal (first data transmitted from the base station 110 to the terminal 210) can be improved. In the example of FIG. 6, although it is described that the base station 110 performs a calculation of the transmission weight based on the feedback information on the propagation channel state from the terminal 210, the terminal 210 may calculate the transmission weight based on the propagation channel state, and the calculated transmission weight may be included in the feedback information transmitted to the base station 110.

Upon receiving the desired data (first data) to the cooperative transmission target terminal 210 from the core node 130 at the same time when calculating the value of the transmission weight (STEP 4). Upon receiving the desired data (second data) to the cooperative transmission target terminal 220 from the core node 130 (STEP 5), the cooperative target base station 120 duplicates the second data and transmits it to the cooperative source base station 110 together with the predetermined control information on the cooperative transmission (cooperative transmission control information) (STEP 6). For the transmission of the second data from the cooperative target base station 120 to the cooperative source base station 110, a tunneling protocol such as a GTPv2 (GPRS Tunneling Protocol Version 2), etc. can be used via an inter-base station communication interface such as an X2 interface, etc. which is a standard interface of an inter-base station connection of the LTE. The cooperative transmission control information may include a data cooperative transmission timing and MCS information for remotely controlling the cooperative resource of the cooperative source base station 110. The MCS information is information that defines a modulation system and an encoding system, and is calculated by the scheduler 126 of the cooperative target base station 120 based on the feedback information (refer to FIG. 7).

Then, the cooperative source base station 110 multiplies the first data and the second data received from the cooperative target base station 120 by the transmission weight to generate a transmission signal (STEP 7), and transmits the transmission signal to the terminal 210 of the cell border area A at the data cooperative transmission timing by the predetermined cooperative resource that is set in advance, by the cooperative resource controlled remotely by the cooperative target base station 120 (STEP 8). On the other hand, the cooperative target base station 120 transmits a transmission signal of the second data to the terminal 210 in the cell border area A and the terminal 220 in the own cell at the data cooperative transmission timing by the predetermined cooperative resource that is set in advance (STEP 8).

In the cooperative transmission in FIG. 6, when the cooperative source base station 110 and the cooperative target base station 120 are synchronized in time by the GPS, etc. it is capable of performing a cooperative transmission from the cooperative source base station 110 and the cooperative target base station 120 at the data cooperative transmission timing included in the cooperative transmission control information. Moreover, since the transmission signal of the second data delivered as an interference signal from the cooperative target base station 120 to the terminal 210 of the cell border area A can be cancelled by the transmission signal with an opposite phase to the second data, which is multiplied by the predetermined transmission weight and transmitted from the cooperative source base station 110, the inter-base station interference in the terminal 210 of the cell border area A can be suppressed.

In the terminal 210, information on state of propagation channel from the cooperative source base station 110 and the cooperative target base station 120 is information that changes every moment. Therefore, the feedback information from the terminal 210 is transmitted in a relatively short cycle. For example, in the LTE, the CSI feedback is transmitted from the terminal to the base station every 1 millisecond. Therefore, the processing procedures during the cooperative transmission shown in FIG. 6 are repeatedly executed whenever the feedback information is received from the terminal 210, while the cooperative transmission of the inter-base station cooperative MU-MIMO is performed. As described above, the cooperative transmission of the inter-base station cooperative MU-MIMO can be executed, by calculating the optimal MCS information and the transmission weight in accordance with the state of the propagation channel that changes every moment.

Figure 7:
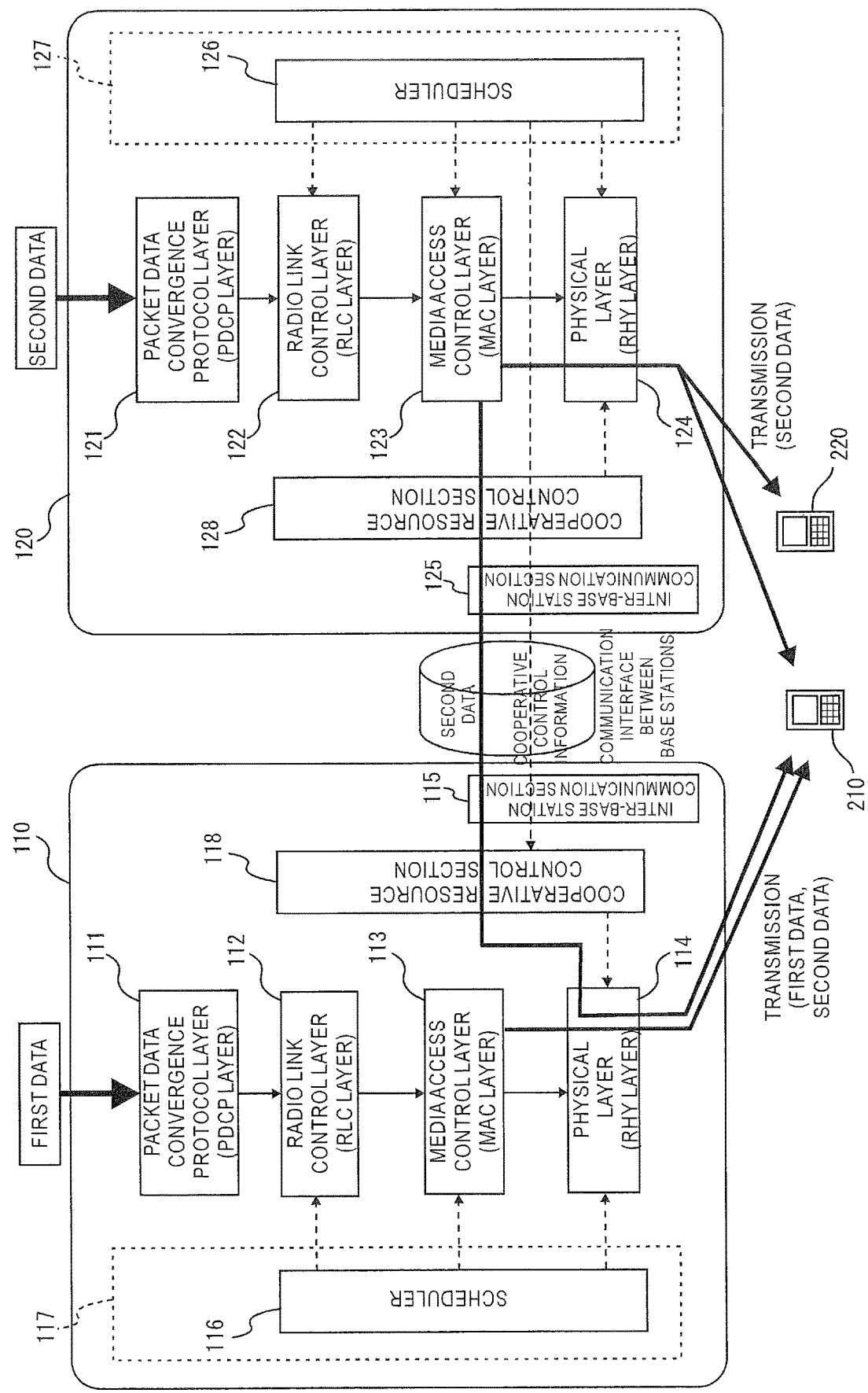
FIG. 7 is a functional block diagram showing an example of a communication layer structure of a cooperative source base station and a cooperative target base station during cooperative transmission of the communication system according to the embodiment.

FIG. 7 is a functional block diagram showing an example of a communication layer structure of the cooperative source base station 110 and the cooperative target base station 120 during the cooperative transmission. Each of the base stations 110 and 120 has a multilayered communication layer structure consisting of data convergence protocol layers (PDCP layer) 111 and 121, radio link control layers (RLC layer) 112 and 122, media access control layers (MAC layer) 113 and 123, and physical layer (PHY layer) 114 and 124.

The PDCP layers 111 and 121 perform a process such as a data compression, encryption, extension and decoding. The RLC layers 112 and 122 perform a process such as a data division, combination, order control and retransmission (ARQ: Automatic Repeat-Request). The MAC layer 113 and 123 perform a process such as a scheduling, multiplexing, retransmission (HARQ: Hybrid Automatic Repeat Request) of data transmission.

The PHY layers 114 and 124 perform a process such as a modulation, demodulation, encoding of a high-frequency transceived signal that is transceived with the terminals 210 and 220. In case of the cooperative transmission source base station, in the PHY layer 114, a transmission signal is generated by applying the transmission weight calculated in advance based on the feedback information to the desired data (first data) for the terminal located in the cell border area A and the desired data (second data) transferred from the cooperative target base station for the terminal located in the cooperative target cell. The PHY layers 114 and 124 also function as a radio communication section that performs a radio communication with the terminals 210 and 220.

At the start of cooperation, the control section 117 of the cooperative source base station 110 determines cooperative resources (for example, frequencies) used for a data cooperative transmission in each of the cooperative source base station 110 and cooperative target base station 120, and lends the cooperative resources to the cooperative target base station 120.

At the start of cooperation, the control section 127 of the cooperative target base station 120 borrows the cooperative resources determined by the cooperative source base station 110 from the cooperative source base station 110. The control section 127 remotely controls the cooperative resources borrowed from the cooperative source base station 110. Furthermore, in order to remotely control the cooperative resources of the cooperative source base station 110, the control section 127 transmits the second data of cooperative transmission target for the terminal 220 in the own cell and cooperative transmission control information to the cooperative source base station 110.

The plurality of base stations 110 and 120 is respectively provided with inter-base station communication sections 115 and 125, schedulers 116 and 126, and cooperative resource control sections 118 and 128. The inter-base station communication sections 115 and 125 communicate with other base stations other than the own base station via the inter-base station communication interface such as the X2 interface using a wired link or radio communication link.

The schedulers 116 and 126 respectively constitute a part of the control sections 117 and 127 that control a process and operation in the base stations 110 and 120, determine which radio resource is to be used for transmission, which modulation system is to be used for transmission, which encoding system is to be used for transmission, and the like, and perform a data transmission by controlling the above-mentioned RLC layers 112 and 122, the MAC layers 113 and 123 and the PHY layers 114 and 124. For example, the scheduler 116 of the cooperative source base station 110 determines which cooperative resource is to be used for transmission, and controls the RLC layer 112, the MAC layer 113 and the PHY layer 114 of the cooperative source base station 110 during the cooperative transmission. The scheduler 126 of the cooperative target base station 120 controls the RLC layer 122, the MAC layer 123 and the PHY layer 124 of the cooperative target base station 120 during the cooperative transmission, controls the PHY layer 114 of the cooperative source base station 110, and performs a cooperative transmission of the inter-base station cooperative MU-MIMO via the cooperative resource control section 118 of the cooperative source base station 110.

The cooperative source base station 110 is provided with the cooperative resource control section 118 for remotely controlling the cooperative resource of the cooperative transmission target data based on the cooperative transmission control information transmitted from the cooperative target base station 120. The cooperative resource in the cooperative source base station 110 is lent to the cooperative target base station 120 via the cooperative resource control section 118, and can be remotely controlled by the scheduler 126 of the cooperative target base station 120.

It is noted that, the scheduler 126 of the cooperative target base station 120 controls the PHY layer 124 of the cooperative target base station 120, and performs a cooperative transmission of the inter-base station cooperative MU-MIMO via the cooperative resource control section 128.

In FIG. 7, the cooperative target base station 120 receives the second data from the core node and performs a process in processes the PDCP layer 121, the RLC layer 122 and the MAC layer 123 to generate a data that is called a an MAC-PDU. (Hereinafter, the MAC-PDU generated from the second data is called as an "MAC-PDU2") The scheduler 126 of the cooperative target base station 120 calculates information (MCS information) on a modulation system and encoding system to be applied to the MAC-PDU2 from the feedback information from the terminal 220. Then, the cooperative resource control section 118 of the cooperative source base station 110 receives the MAC-PDU2 of cooperative transmission target from the MAC layer 123 of the cooperative target base station 120 via the communication link, and transfers the MAC-PDU2 to the PHY layer 114 of the cooperative source base station 110. The cooperative resource control section 118 receives the cooperative transmission control information (information on the data cooperative transmission timing, MCS information, etc.) from the scheduler 126 of the cooperative target base station 120 via the communication link (inter-base station communication interface). At this time, the cooperative transmission control information may be included in header information of the MAC-PDU2 or the like. The cooperative resource control section 118 processes the MAC-PDU2 in the PHY layer 114 in the cooperative source base station 110 based on the cooperative transmission control information received from the cooperative target base station 120. Specifically, the modulation processing and encoding processing with the modulation system and the encoding system designated in the MCS information is performed for the MAC-PDU2 in the PHY layer 114. The cooperative source base station 110 receives the first data from the core node and performs a process in the PDCP layer 111, the RLC layer 112 and the MAC layer 113 to generate a data that is called a an MAC-PDU. (Hereinafter, the MAC-PDU generated from the first data is called as an "MAC-PDU1") The scheduler 116 of the cooperative source base station 110 calculates information (MCS information) on a modulation system and encoding system to be applied to the MAC-PDU1 from the feedback information from the terminal 210. Then, the modulation process and encoding process by the modulation system and the encoding system designated in the MCS information is performed for the MAC-PDU1 in the PHY layer 114. Furthermore, the PHY layer 114 of the cooperative source base station 110 multiplies the MAC-PDU1 and the MAC-PDU2, to which the modulation process and the encoding process are performed, by the calculated transmission weights, and performs a transmission process from the PHY layer 114 to the terminal 210 in the cell border area A at the time designated by the data cooperative transmission timing information.

In FIG. 7, the cooperative resource control section 128 of the cooperative target base station 120 performs the modulation process and the encoding process in the PHY layer 124 by the modulation system and the encoding system designated in the MCS information calculated by the above-mentioned scheduler 126, and also performs a transmission process from the PHY layer 124 to the terminal 220 in the own cell and the terminal 210 in the cell border area A at the time designated in the data cooperative transmission timing information.

It is noted that, the function of the cooperative resource control section 128 may be incorporated into the control section 127 in the cooperative target base station 120 without independently providing the cooperative resource control section 128. Similarly, the function of the cooperative resource control section 118 may be incorporated into the control section 117 in the cooperative source base station 110 without independently providing the cooperative resource control section 118.

The hardware of the base stations 110 and 120 used for the communication system with the aforementioned configuration, for example, is configured with a transmitting amplifier, a receiving amplifier, a radio signal processing section, a baseband signal processing section, a wire transmission link interface section, a computer apparatus or the like, in addition to an antenna. Among these hardware configuration components, the antenna, the transmitting amplifier and the receiving amplifier correspond to the aforementioned radio communication section, and the wired transmission link interface section corresponds to the aforementioned inter-base station communication section.

The computer apparatus is configured with, for example, a micro computer, functions as the aforementioned control section 117 and 127 and the cooperative resource control section 118 and 128, and controls each of the sections based on a predetermined control program that is incorporated in advance. Especially, by controlling the radio signal processing section and the baseband signal processing section based on the predetermined control program, the computer apparatus processes the transceived data and signals for example, via the plurality of communication layer structures such as the aforementioned PDCP layer, RLC layer, MAC layer and PHY layer.

Figure 8:
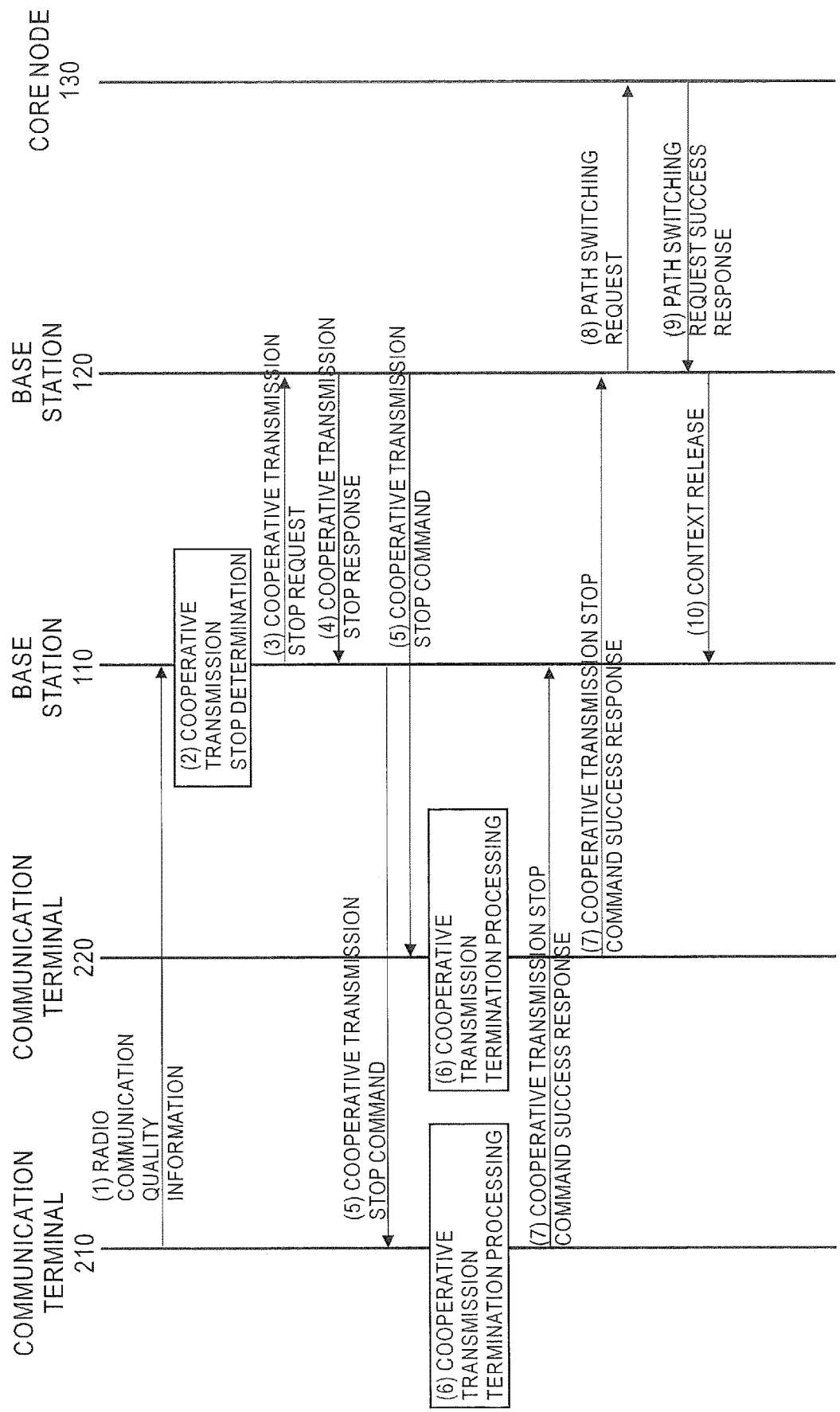
FIG. 8 is a sequence diagram showing an example of a communication control after stopping the cooperative transmission of the communication system according to the embodiment.

FIG. 8 is a sequence diagram showing an example of a processing procedure when stopping the cooperative transmission at the time of transition from the state of FIG. 3B to the state of FIG. 3C. In FIG. 8, the cooperative source base station 110 receives radio communication quality information from the terminal 210 (STEP 1), determines that the terminal 210 moves out the cell border area A and locates in the area of the cell 120a of the cooperative target base station 120, for example, when an electric field strength in the base station 120 is larger than an electric field strength in the base station 110 by a predetermined threshold value (cooperative stop threshold) based on the radio communication quality information, determines the stop of the cooperative transmission (cooperative transmission of the inter-base station cooperative MU-MIMO) (STEP 2). And the cooperative source base station 110 transmits a cooperative transmission stop request to the cooperative target base station 120 (STEP 3). Upon receiving the cooperative transmission request from the cooperative source base station 110, the cooperative target base station 120 returns the frequency resources borrowed from the cooperative source base station 110, cancels the selection of the terminal 220, and transmits a cooperative transmission stop response to the cooperative source base station 110 (STEP 4), and transmits a cooperative transmission stop command to the terminal 220 (STEP 5). When receiving the cooperative transmission stop response from the cooperative target base station 120 (STEP 4), the cooperative source base station 110 transmits the cooperative transmission stop command to the terminal 210 (STEP 5).

Upon receiving the cooperative transmission stop command, each of the terminals 210 and 220 stops the foregoing activated cooperative transmission program and performs a cooperative transmission termination processing (STEP 6). When a normal data communication is enabled, each of the terminals 210 and 220 transmits a success response of the cooperative transmission stop command to the base stations 110 and 120 (STEP 7).

Upon receiving the success response of the cooperative transmission stop command from the terminal 220, the cooperative target base station 120 transmits a path switching request for performing a handover by switching the data communication path with respect to the terminal 210, to the core node 130 (STEP 8). Upon receiving the success response of path switching request from the core node 130, the cooperative target base station 120 establishes a link for data transmission and reception via the base station 120 (STEP 9). Then, a context release is transmitted from the base station 120 to the base station 110, and the handover process of the terminal 210 from the base station 110 to the base station 120 is completed. As described above, the termination process of cooperative transmission is completed, and afterwards the normal data transmission for transmitting a data from the core node 130 to the terminal 210 via the base station 120 is performed.

It is noted that, in the embodiments of FIG. 1 to FIG. 8, although the cases in which only the terminal 210 among the terminals 210 and 220 is located in the cell border area A is described, both of the terminals 210 and 220 may locate in the cell border area A as shown in the following embodiments.

Figure 9:
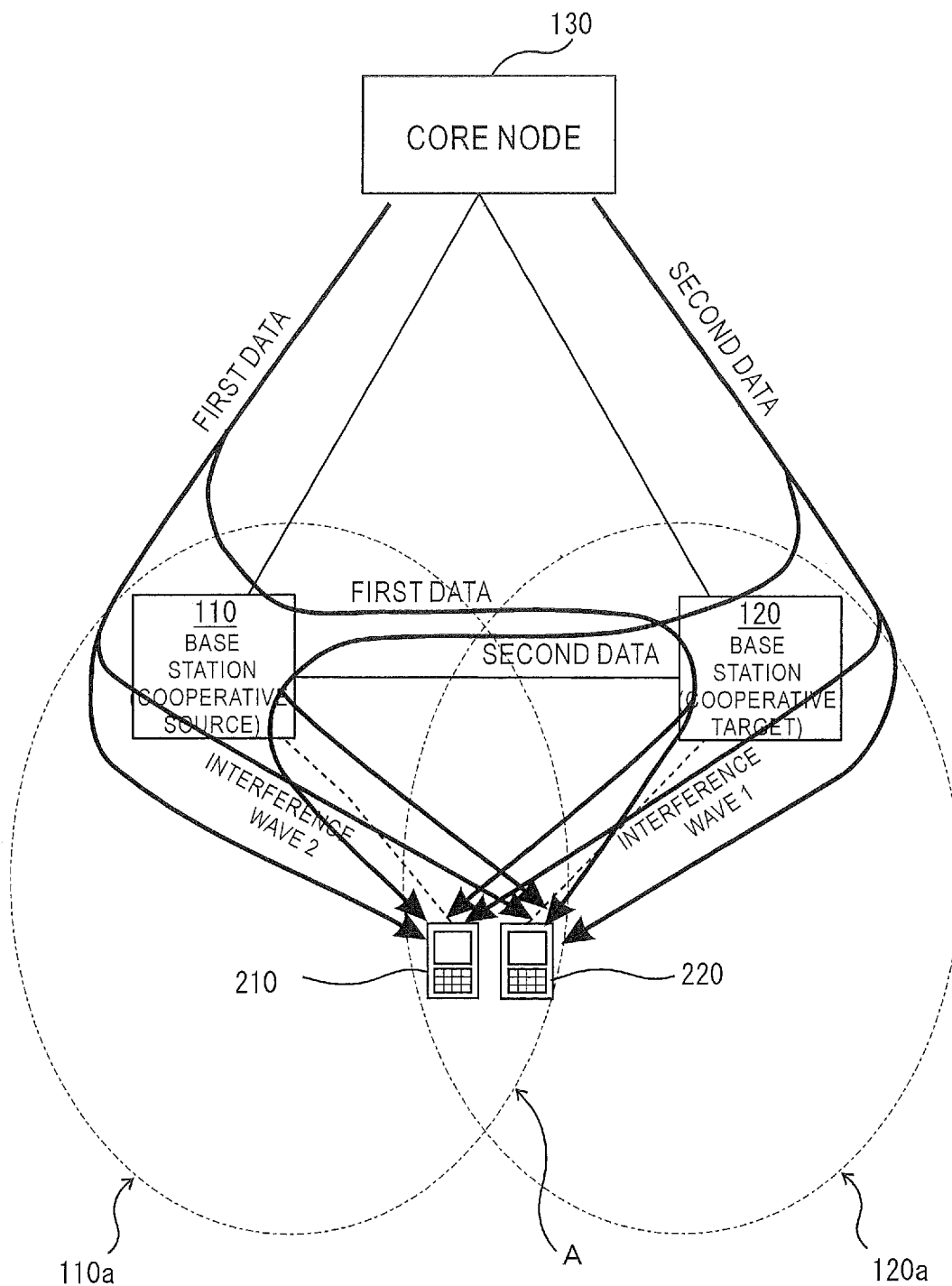
FIG. 9 is an illustration showing one example of a configuration of a communication system according to another embodiment of the present invention.

FIG. 9 is an illustration showing one example of a configuration of a communication system according to another embodiment of the present invention. In the present embodiment, both of the terminals 210 and 220 are located in the cell border area A, the base station 110 and the base station 120 cooperate with each other, and the cooperative transmission using the inter-base station cooperative MU-MIMO is performed for both terminals.

Figure 10:
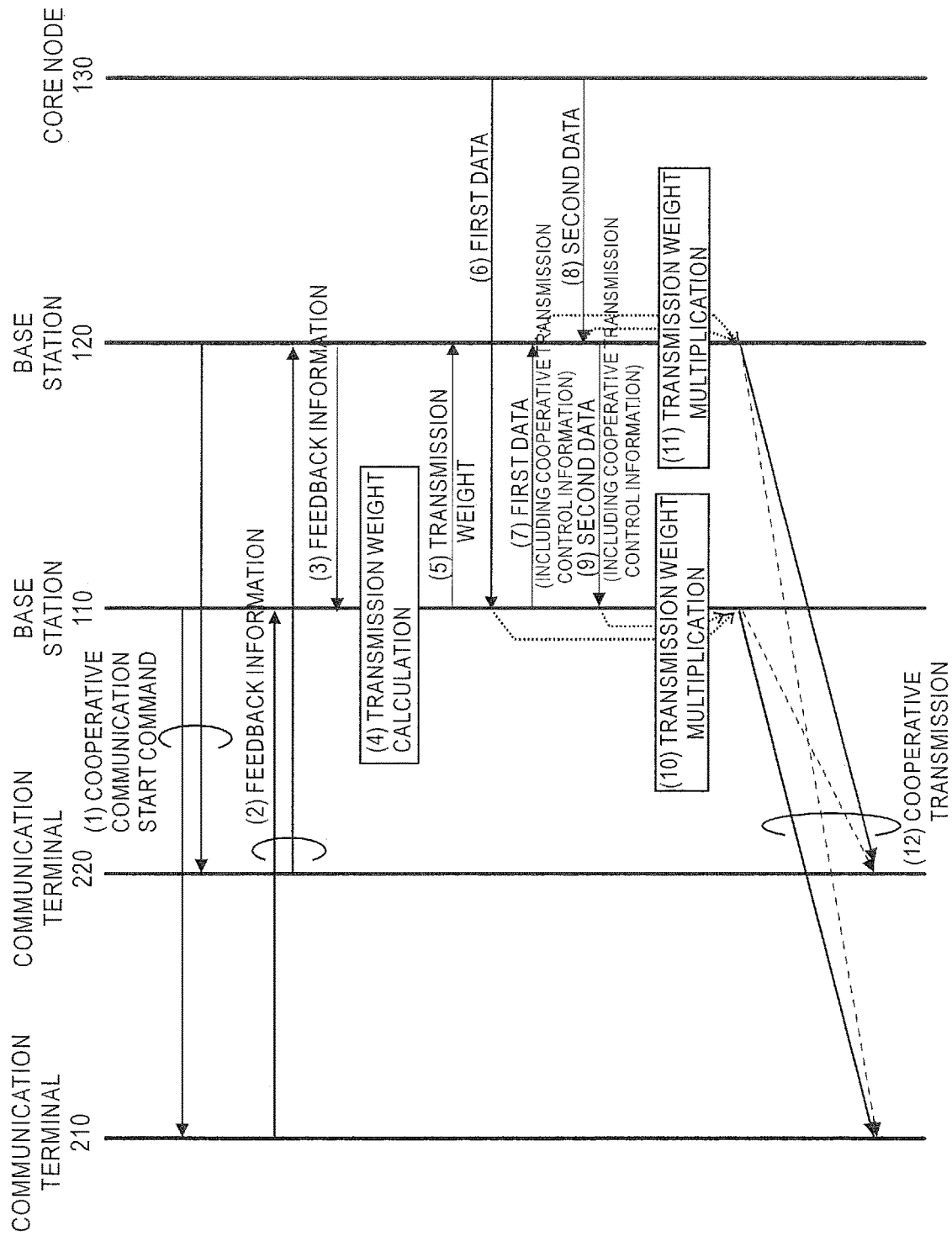
FIG. 10 is a sequence diagram showing an example of a communication control during cooperative transmission of the communication system according to another embodiment.
Figure 11:
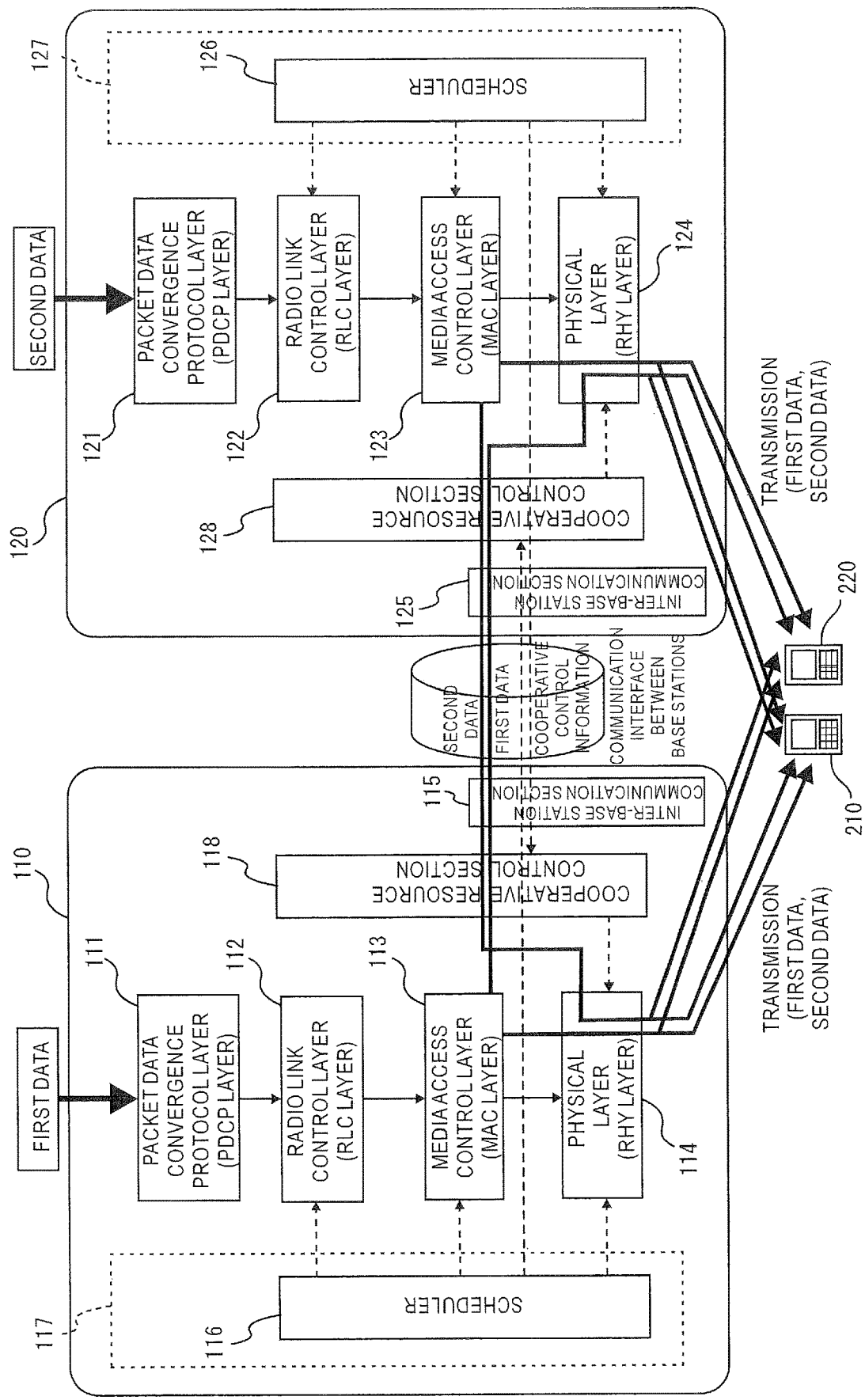
FIG. 11 is a functional block diagram showing an example of a communication layer structure of a base station during cooperative transmission of the communication system according to another embodiment.

It is noted that, in FIG. 9 to FIG. 11, the same reference sign will be used for parts in common with FIG. 1 to FIG. 8 described above, and the description thereof will be omitted.

It is noted that, in the present embodiment, it is assumed that the terminal 210 located in the cell of the base station 110 moves to the cell border area A and starts the cooperative transmission at first, then, the terminal 220 located in the cell of the base station 120 moves to the cell border area A and starts the cooperative transmission during the cooperative transmission.

As shown in FIG. 9, when the terminal 210 and the terminal 220 move and enter into the cell border area A, the signal (interference wave 1) received by the terminal 210 from the base station 120 and the signal (interference wave 2) received by the terminal 220 from the base station 110 become non-negligible, and the signals deteriorate the communication characteristics of the terminal 210 and the terminal 220. Therefore, the base station 110 and the base station 120 start a cooperative transmission of the signals to the terminal 210 and the terminal 220, suppress the signal (interference wave 1) received by the terminal 210 from the base station 120 and the signal (interference wave 2) received by the terminal 220 from the base station 110, improve the communication characteristics in the terminal 210 and the terminal 220, and also continue each of the communication from the base station 120 to the terminal 220 and the communication from the base station 110 to the terminal 210 by using the same radio resources.

FIG. 10 is a sequence diagram showing an example of a processing procedure during the cooperative transmission shown in FIG. 9. In FIG. 10, after a cooperative transmission start notification is transmitted and received from the cooperative source base station 110 to the cooperative target base station 120, the cooperative source base station 110 transmits the cooperative start command to the terminal 210 in the cell border area A, and the cooperative target base station 120 transmits the cooperative start command to the selected terminal 220 located in its own cell (STEP 1).

Upon receiving the cooperative transmission start command from the cooperative source base station 110 (STEP 1), the terminal 210 activates the cooperative transmission processing by starting the predetermined cooperative transmission program for processing a data that is cooperatively transmitted from the base station 110 and becomes a state capable of processing the cooperative transmission data, and transmits feedback information including the propagation channel state of the downlink from the cooperative source base station 110 and the cooperative target base station 120 to the base station 110 (STEP 2). Upon receiving the cooperative transmission start command from the cooperative target base station 120 (STEP 1), the terminal 220 activates the cooperative transmission processing by starting the predetermined cooperative transmission program for processing a data that is cooperatively transmitted from the base station 120 and becomes a state capable of processing the cooperative transmission data, and transmits feedback information including the propagation channel state of the downlink from the cooperative source base station 110 and the cooperative target base station 120 to the base station 120 (STEP 2). The cooperative target base station 120 transmits the feedback information received from the terminal 220 to the cooperative source base station 110 via the inter-base station communication interface (STEP 3).

Upon receiving the feedback information on the each terminals 210 and 220, the cooperative source base station 110 calculates a value of the transmission weight that is applied to the data to be transmitted to the terminals 210 and 220 by the MIMO transmission system at the time of data cooperative transmission (STEP 4), and transmits the value of the transmission weight to the cooperative target base station 120 (STEP 5). The value of the transmission weight, for example, is calculated so that the transmission signal transmitted from the cooperative source base station 110 to the terminal 210 of the cell border area A becomes opposite in phase to the transmission signal (interference wave 1) transmitted from the cooperative target base station 120 in the terminal 210 of the cell border area A, and the transmission signal transmitted from the cooperative target base station 120 to the terminal 220 of the cell border area A becomes opposite in phase to the transmission signal (interference wave 2) transmitted from the cooperative source base station 110 in the terminal 220 of the cell border area A. By using this transmission weight, the interference wave 1 is suppressed in the terminal 210 and the communication quality of the downlink signal (first data transmitted from the base station 110 to the terminal 210) can be improved, and the interference wave 2 is suppressed in the terminal 220 and the communication quality of the downlink signal (second data transmitted from the base station 120 to the terminal 220) can be improved.

When the cooperative source base station 110 receives the first data of cooperative transmission target as a desired data for the terminal 210 from the core node 130 (STEP 6), the cooperative source base station 110 duplicates the first data and transmits it to the cooperative target base station 120 together with the predetermined control information on the cooperative transmission (cooperative transmission control information 1) (STEP 7). When the cooperative target base station 120 receives the second data of cooperative transmission as a desired data for the terminal 220 from the core node 130 (STEP 8), the cooperative target base station 120 duplicates the second data and transmits it to the cooperative source base station 110 together with the predetermined control information on the cooperative transmission (cooperative transmission control information 2) (STEP 9).

It is noted that, for the transmission of the second data from the cooperative target base station 120 to the cooperative source base station 110 and the transmission of the first data from the cooperative source base station 110 to the cooperative target base station 120, the tunneling protocol such as the GTPv2 can be used via the inter-base station communication interface such as the X2 interface which is a standard interface of the inter-base station connection of the LTE. The cooperative transmission control information 1 may be included in the data cooperative transmission timing and the MCS information for remotely controlling the cooperative resource of the cooperative target base station 120. The cooperative transmission control information 2 may be included in the data cooperative transmission timing and the MCS information for remotely controlling the cooperative resource of the cooperative source base station 110.

Then, the cooperative source base station 110 multiplies the first data and the second data received from the cooperative target base station 120 by the transmission weight, generates the transmission signal (STEP 10), and transmits the transmission signal to the terminal 210 and the terminal 220 in the cell border area A at the data cooperative transmission timing by the predetermined cooperative resource that is set in advance, by remotely controlling the cooperative resource by the cooperative target base station 120 (STEP 12). On the other hand, the cooperative target base station 120 multiplies the first data received from the cooperative source base station 110 and the second data by the transmission weight received from the cooperative target base station 110, generates the transmission signal (STEP 11), and transmits the transmission signal to the terminal 210 and the terminal 220 in the cell border area A at the data cooperative transmission timing by the predetermined cooperative resource that is set in advance, by remotely controlling the cooperative resource by the cooperative source base station 110 (STEP 12).

It is noted that, in the present embodiment, since the cooperative transmission to the terminal 210 is determined at first, although the base station 110 functions as the cooperative source base station and the base station 120 functions as the cooperative target base station, the functions of the cooperative source base station and the cooperative target base station are not predetermined for each of the base stations. For example, in cases in which the terminal 220 located in the cell of the base station 120 moves to the cell border area A and starts the cooperative communication and the terminal 210 located in the cell of the base station 110 moves to the cell border area A and starts the cooperative communication during cooperative transmission, the second base station 120 becomes the cooperative source base station that determines the start of the cooperative transmission for the terminal 220, and the first base station 110 becomes the cooperative target base station. As described above, each of the base stations 110 and 120 is capable of having both functions of the cooperative source base station and the cooperative target base station for each of the terminals.

In the cooperative transmission in FIG. 10, when the cooperative source base station 110 and the cooperative target base station 120 are synchronized in time by the GPS, etc. it is capable of performing a cooperative transmission at the data cooperative transmission timing included in the cooperative transmission control information from the cooperative source base station 110 and the cooperative target base station 120. Since the transmission signal of the second data delivered as the interference wave 1 from the cooperative target base station 120 to the terminal 210 of the cell border area A can be cancelled by the transmission signal with an opposite phase to the second data, which is multiplied by the predetermined transmission weight and transmitted from the cooperative source base station 110, and the transmission signal of the first data delivered as the interference wave 2 from the cooperative source base station 110 to the terminal 220 of the cell border area A can be cancelled by the transmission signal with an opposite phase to the first data, which is multiplied by the predetermined transmission weight and transmitted from the cooperative target base station 120, and the inter-base station interference in the terminal 210 and the terminal 220 of the cell border area A can be suppressed.

In the terminal 210 and the terminal 220, information on state of propagation channel from the cooperative source base station 110 and the cooperative target base station 120 is information that changes every moment. Therefore, the feedback information from the terminal 210 and the terminal 220 are transmitted at a relatively short cycle. For example, in the LTE, the CSI feedback is transmitted from the terminal to the base station every 1 millisecond. Therefore, the processing procedures during the cooperative transmission shown in FIG. 10 are repeatedly executed whenever the feedback information are received from the terminal 210 and the terminal 220, while the cooperative transmission of the inter-base station cooperative MU-MIMO is performed. As described above, the cooperative transmission of the inter-base station cooperative MU-MIMO can be executed, by calculating the optimal MCS information and the transmission weight with the state of the propagation channel that changes every moment.

FIG. 11 is a functional block diagram showing an example of a communication layer structure of the cooperative source base station 110 and the cooperative target base station 120 during the cooperative transmission. It is noted that, with respect to parts in common with FIG. 7, the description thereof will be omitted. In FIG. 11, the cooperative source base station 110 receives the first data from the core node and performs the processes on the PDCP layer 111, the RLC layer 112 and the MAC layer 113 to generate the MAC-PDU 1. The generated MAC-PDU 1 is duplicated and the duplicated MAC-PDU1 is transmitted to the cooperative target base station 120 via the communication link (inter-base station communication interface). The cooperative target base station 120 receives the second data from the core node and performs the processes on the PDCP layer 121, the RLC layer 122 and the MAC layer 123 to generate the MAC-PDU 2. The generated MAC-PDU 2 is duplicated and the duplicated MAC-PDU2 is transmitted to the cooperative source base station 110 via the communication link (inter-base station communication interface).

The cooperative resource control section 118 of the cooperative source base station 110 receives the MAC-PDU2 of cooperative transmission target from the MAC layer 123 of the cooperative target base station 120 via the communication link (inter-base station communication interface), and transfers the MAC-PDU2 to the PHY layer 114 in the cooperative source base station 110.

The cooperative resource control section 118 receives the cooperative transmission control information 2 (information on the data cooperative transmission timing, MCS information, etc.) from the scheduler 126 of the cooperative target base station 120 via the communication link (inter-base station communication interface). At this time, the cooperative transmission control information 2 may be included in the header information of the MAC-PDU2 or the like. The cooperative resource control section 118 processes the MAC-PDU2 in the PHY layer 114 in the cooperative source base station 110 based on the cooperative transmission control information 2 received from the cooperative target base station 120. Specifically, the modulation processing and the encoding processing in the PHY layer 114 are performed on the MAC-PDU2 with the modulation system and the encoding system designated in the MCS information. The scheduler 116 of the cooperative source base station 110 calculates the MCS information and the like to be applied to the MAC-PDU1, by the feedback information from the terminal 210. Then, the modulation processing and the encoding processing in the PHY layer 114 are performed on the MAC-PDU1 with the modulation system and encoding system designated in the MCS information. Furthermore, the MAC-PDU1 and the MAC-PDU2, on which the modulation process and the encoding process are performed, are multiplied by the calculated transmission weight, and a transmission process to the terminal 210 and the terminal 220 in the cell border area A from the PHY layer 114 is performed at the data cooperative transmission timing.

The cooperative resource control section 128 of the cooperative target base station 120 receives the MAC-PDU1 of cooperative transmission target from the MAC layer 113 of the cooperative source base station 110 via the communication link (inter-base station communication interface), and transfers the MAC-PDU1 to the PHY layer 124 in the cooperative target base station 120. The cooperative resource control section 128 receives the cooperative transmission control information 1 (MCS information, etc.) from the scheduler 116 of the cooperative source base station 110 via the communication link (inter-base station communication interface). At this time, the cooperative transmission control information 1 may be included in the header information of the MAC-PDU1 or the like. The cooperative resource control section 128 processes the MAC-PDU1 in the PHY layer 124 in the cooperative target base station 120 based on the cooperative transmission control information 1 received from the cooperative source base station 110. Specifically, the modulation processing and the encoding processing in the PHY layer 124 are performed on the MAC-PDU1 with the modulation system and the encoding system designated in the MCS information. The scheduler 126 of the cooperative target base station 120 calculates the MCS information and the like to be applied to the MAC-PDU2, by the feedback information from the terminal 220. Then, the modulation processing and the encoding processing in the PHY layer 124 are performed on the MAC-PDU2 with the modulation system and the encoding system designated in the MCS information. Furthermore, the MAC-PDU1 and the MAC-PDU2, on which the modulation process and the encoding process are performed, are multiplied by the transmission weight received from the base station 110, and a transmission process to the terminal 210 and the terminal 220 in the cell border area A from the PHY layer 124 is performed at the data cooperative transmission timing.

Figure 12:
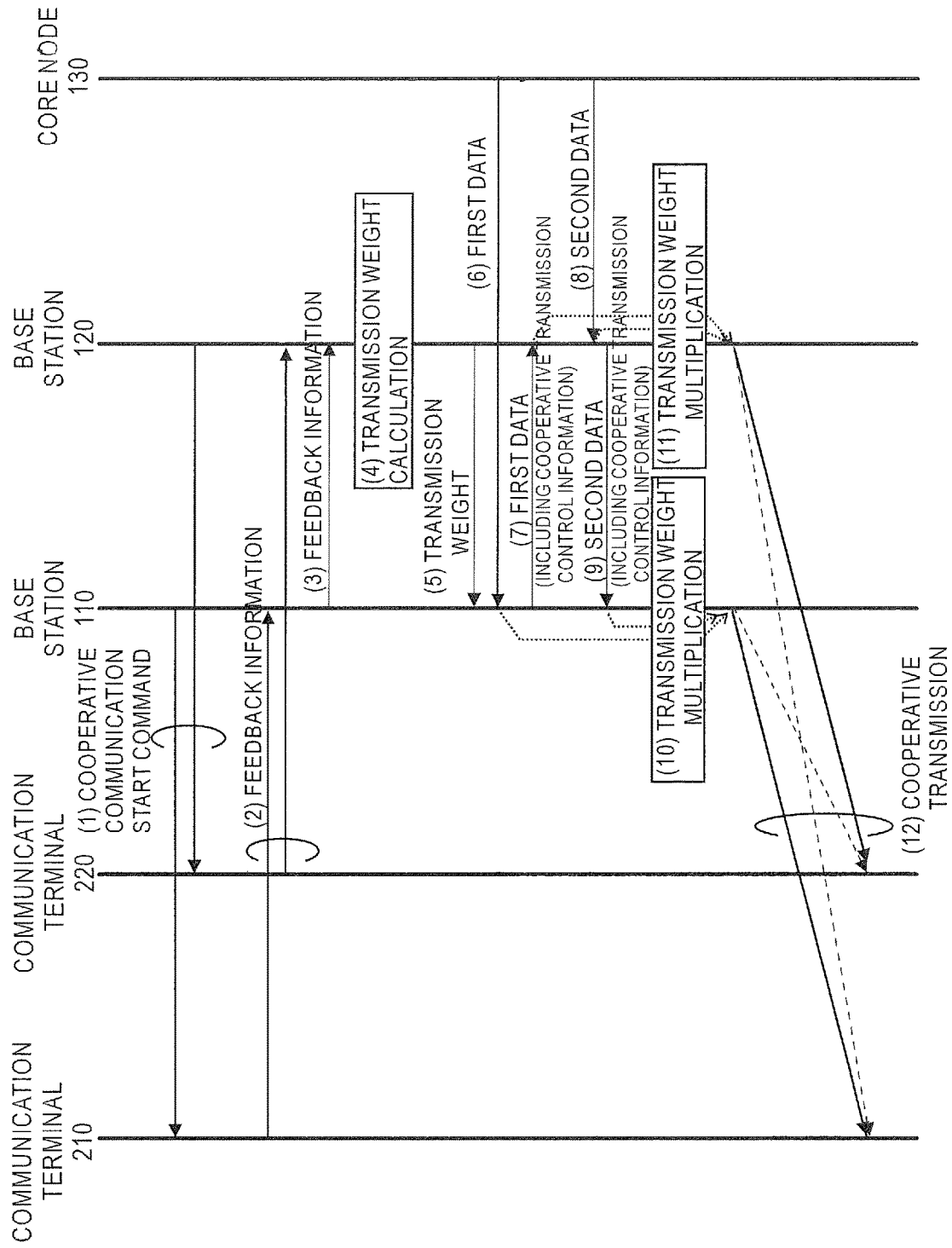
FIG. 12 is a sequence diagram showing an example of a communication control during cooperative transmission of the communication system according to still another embodiment.

In the example of FIG. 10, although the cooperative source base station calculates the transmission weight in the STEP 4, the cooperative target base station may calculate the transmission weight as shown in FIG. 12. In the example of FIG. 12, by transmitting the feedback information received from the terminal 210 to the cooperative target base station 120 by the cooperative source base station 110 in the STEP 3, calculating the transmission weight by the cooperative target base station 120 in the STEP 4, and transmitting the calculated transmission weight from the cooperative target base station 120 to the cooperative source base station 110 in the STEP 5, the same effect can be realized.

Furthermore, in the aforementioned embodiments, although the cooperative source base station 110 transmits the cooperative transmission start request to the cooperative target base station 120, receives the cooperative transmission start response including the information on a vacant resource as a candidate of the cooperative resource from the cooperative target base station 120 that received the cooperative transmission start request, and determines the cooperative resource based on the cooperative transmission start response, the cooperative resource may be determined by other methods.

For example, the cooperative source base station 110 may transmit the cooperative transmission start request including the information on a vacant resource information as a candidate of the cooperative resource to the cooperative target base station 120, receive the cooperative transmission start response including a result of determining whether the candidate of the cooperative resource are available or not, from the cooperative target base station 120 that received the cooperative transmission start request, and determine the cooperative resource based on the cooperative transmission start response.

Moreover, in the aforementioned embodiments, although the determining, lending and borrowing of the cooperative resources are performed at the time of the cooperative transmission start, the determining, lending and borrowing may be performed periodically at predetermined timing set in advance. For example, the determining, lending and borrowing of the cooperative resource may be performed periodically (for example, every one second, five seconds or ten seconds) in a cyclic timing sufficiently longer than the time of inter-base station communication (several milliseconds).

Further, the determining, lending and borrowing of the cooperative resource may be performed based on the channel quality indicator (CQI: channel quality indicator) indicating a quality of radio communication in the terminal 210. This CQI indicates the quality of radio communication channel in the base station that the terminal 210 can perform a radio communication therewith, for each of a plurality of radio communication channels (a plurality of frequencies), and the CQI is included in the feedback information from the terminal 210. For example, it is determined whether the CQI value of each radio communication channel (frequency) is changed by more than a predetermined range or not, based on the CQI received from the terminal 210. Then, at the timing when the CQI value changes by more than the predetermined range, the determining, lending and borrowing of the cooperative resource are performed so as to switch to a radio communication channel (frequency) resource that is optimum for the cooperative transmission.

As described above, according to the aforementioned embodiment, while suppressing the interference in the terminal 210 located in the cell border area A, it is capable of efficiently performing the cooperative transmission of data from the plurality of base stations 110 and 120 to the plurality of terminals 210 and 220 including the terminal 210 by using the same radio resources. Furthermore, in cases that the plurality of terminals 210 and 220 are located in the cell border area A, while suppressing the interference in the terminals 210 and 220 located in the cell border area A, it is capable of efficiently performing the cooperative transmission of data from the plurality of base stations 110 and 120 to the plurality of terminals including the terminals 210 and 220 by using the same radio resources.

Moreover, according to the aforementioned embodiment, by selecting the terminal 220 as a terminal for the cooperative transmission target, to which the transmission signal with the weakest interference for the terminal 210 in the cell border area A is transmitted from the cooperative target base station 120, among the plurality of terminals 220, 221 and 222 located in the cell of the cooperative target base station 120, it is capable of securely reducing the inter-base station interference in the terminal 210 of the cell border area A at the time of the data cooperative transmission. Further, since the cooperative target base station 120 selects the cooperative transmission target terminal 220 based on the location information such as the GPS of the plurality of terminals located in the cell of the base station 120, the terminal selection process can be simplified and it is capable of promptly starting the data cooperative transmission from the plurality of base stations 110 and 120.

According to the aforementioned embodiment, each of the cooperative source base station 110 and the cooperative target base station 120 performs the cooperative transmission by the MIMO transmission system that uses a plurality of antennas, and uses the transmission weight that is a weight coefficient multiplied by the transmission signal transmitted from the plurality of transmission antennas, as an interference suppression parameter. By applying this transmission weight to the transmission signals of the first data and the second data to be transmitted to the terminal 210 located in the cell border area A, it is capable of easily and surely generating the transmission signal having a phase opposite to the transmission signal of the second data transmitted from the cooperative target base station 120, in the terminal 210 in the cell border area A.

Furthermore, according to the aforementioned embodiment, since the cooperative source base station 110 can unitarily control the cooperative resource in each of the base stations 110 and 120, it is capable of more surely performing the management of cooperative resources used for the cooperative transmission from each of the base stations 110 and 120, as compared to the case that each of the base stations 110 and 120 individually controls the cooperative resources. Moreover, in a state in which the cooperative source base station 110 can unitarily control the cooperative resource, it is capable of repeatedly performing the data cooperative transmission from each of the base stations 110 and 120 to the plurality of terminals 210 and 220. Accordingly, it is less susceptible to the communication delay between the base stations 110 and 120 and the efficiency of cooperative transmission is improved as compared to a case that the cooperative resource is adjusted by a negotiation between the base stations 110 and 120 every timing of data cooperative transmission.

Moreover, according to the aforementioned embodiment, by performing the determining, lending and borrowing of the cooperative resource at the time of the cooperative transmission start to enable the cooperative transmission, since the optimal cooperative resources can be used based on the vacant state of the radio communication resources at the time of the cooperative transmission start, it is capable of surely performing the data cooperative transmission.

Further, according to the aforementioned embodiment, by periodically performing the determining, lending and borrowing of the cooperative resource at the time of the predetermined timing that is set in advance, since the cooperative resource can be updated to more suitable cooperative resources for the cooperative transmission, it is capable of surely performing the data cooperative transmission.

Furthermore, according to the aforementioned embodiment, by performing the determining, lending and borrowing of the cooperative resource based on the quality information (CQI) of the radio communication between the base stations 110 and 120 and the terminals 210 and 220, the cooperative resource can be updated to more suitable radio communication resources for the cooperative transmission in accordance with the change of situation in the radio communication between the base stations and the terminals.

Moreover, according to the aforementioned embodiment, the cooperative source base station 110 transmits the cooperative transmission start request to the cooperative target base station 120, receives the cooperative transmission start response including the information on the vacant radio communication resource as a candidate of the cooperative resource from the cooperative target base station 120 that receives the cooperative transmission start request, and determines the cooperative resource based on the cooperative transmission start response. In this way, by determining the cooperative resource based on the cooperative transmission start response including the information on the vacant radio communication resource as a candidate of the cooperative resource in the cooperative target base station 120, the cooperative source base station 110 does not need to transmit the determined cooperative resource information to the cooperative target base station 120. Therefore, it is capable of improving the efficiency of initialization process of the cooperative transmission. Especially, in this case, since the vacant radio communication resource as a candidate of the cooperative resource in the cooperative target base station 120 is presented to the cooperative source base station 110, the vacant radio communication resource can be set preferentially as a cooperative resource.

Further, according to the aforementioned embodiment, the cooperative source base station 110 may transmit the cooperative transmission start request including the candidate of the cooperative resource to the cooperative target base station 120, receive the cooperative transmission start response including the result of determining whether the candidate of the cooperative resource are available or not from the cooperative target base station 120 that receives the cooperative transmission start request, and determine the cooperative resource based on the cooperative transmission start response. Also in this case, the cooperative source base station 110 does not need to transmit the determined cooperative resource information to the cooperative target base station 120. Therefore, it is capable of improving the efficiency of initialization process of the cooperative transmission. Especially, in this case, since the vacant radio communication resource of the cooperative source base station 110 can be presented to the cooperative target base station 120 as a candidate of the cooperative resource, the vacant radio communication resource in the cooperative source base station 110 can be set preferentially as a cooperative resource.

The process steps and configuration elements in the mobile communication system, the base station and the communication terminal apparatus (terminal, user terminal equipment, mobile station) described in the present specification can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, various wireless communication apparatuses, Node B, communication terminal apparatus, hard disk drive apparatus, or optical disk drive apparatus) may be implemented in one or more of an application-specific IC (ASIC), a digital signal processor (DSP), a digital signal processing apparatus (DSPD), a programmable logic device (PLD), a field programmable gate array (FPGA), a processor, a controller, a microcontroller, a microprocessor, a electronic device, other electronic unit, computer, or a combination thereof, which are designed so as to perform a function described in the present specification.

With respect to the firmware and/or software implementation, means such as processing units or the like for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The description of embodiments disclosed in the present specification is provided so that the present disclosures can be produced or used by those skilled in the art. Various modifications of the present disclosures will be readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST 10 communication system
110 cooperative source base station (first base station)
120 cooperative target base station (second base station)
111, 121 packet data convergence protocol layers (PDCP layer)
112, 122 radio link control layer (RLC Layer)
113, 123 media access control layer (MAC Layer)
114, 124 physical layer (PHY Layer)
115, 125 inter-base station communication section
116, 126 scheduler
117, 127 control section
118, 128 cooperative resource control section
130 core node
210, 220, 221, 222 terminal
A cell border area

The invention claimed is:

1. A communication system capable of cooperatively transmitting a data from a first base station and a second base station by radio communication,
wherein the first base station acquires a value of a first interference suppression parameter that is applied to a first transmission signal from the first base station so as to suppress an interference from the second base station in a first communication terminal, when the first communication terminal having the first base station as a desired station is located in a cell border area between a cell of the first base station and a cell of the second base station,
wherein the second base station duplicates a first desired data for a second communication terminal having the second base station as a desired station located in the cell of the second base station, and transmits the duplicated first desired data to the first base station via an inter-base station communication interface,
wherein the first base station generates the first transmission signal by applying the value of the first interference suppression parameter to a first desired data for the first communication terminal and the first desired data for the second communication terminal received from the second base station,
wherein the second base station generates a second transmission signal of the desired data for the second communication terminal, and
wherein the first base station and the second base station cooperatively transmit the first generated transmission signal and the second generated transmission signal, respectively, according to a predetermined data cooperative transmission timing.

2. The communication system according to claim 1, wherein the first base station:
transmits a cooperative transmission start request to the second base station;
receives a cooperative transmission start response including information on a vacant radio communication resource from the second base station that received the cooperative transmission start request;
determines a cooperative resource to be used for data cooperative transmission in each of the first base station and the second base station based on the cooperative transmission start response; and
transmits a cooperative transmission start notification including the information on the determined cooperative resource to the second base station, and
wherein the second base station:
transmits to the first base station the cooperative transmission start response including the information on the vacant radio communication resource that is a candidate of the cooperative resource to the first base station; and
receives the cooperative transmission start notification including the information on the determined cooperative resource from the first base station that receives the cooperative transmission start response.

3. The communication system according to claim 2, wherein the first base station lends the cooperative resource capable of performing a remote control from the second base station, and
wherein the second base station remotely controls the first desired data for the second communication terminal, which is transmitted to the first base station via the inter-base station communication interface, by using the cooperative resource lent by the first base station, and transmits the first desired data for the second communication terminal from the first base station to the first communication terminal.

4. The communication system according to claim 1, wherein the first base station:

transmits to the second base station a cooperative transmission start request including information on a vacant resource to be a candidate for a cooperative resource;

receives a cooperative transmission start response including an available radio resource among the information on the vacant resource to be the candidate for the cooperative resource from the second base station that receives the cooperative transmission start request;

determines the cooperative resource to be used for a data cooperative transmission in each of the first base station and the second base station based on the cooperative transmission start response; and transmits to the second base station a cooperative transmission start notification including the information on the determined cooperative resource, wherein the second base station:

selects the available radio resource among the information on the vacant resource to be the candidate for the cooperative resource including the cooperative transmission start request received from the first base station;

transmits the cooperative transmission start response including the available radio resource; and receives the cooperative transmission start notification including the information on the determined cooperative resource from the first base station that receives the cooperative transmission start response.

5. The communication system according to claim 4, wherein the first base station lends the cooperative resource capable of performing a remote control from the second base station, and wherein the second base station remotely controls the first desired data for the second communication terminal, which is transmitted to the first base station via the inter-base station communication interface, by using the cooperative resource lent by the first base station, and transmits the first desired data from the first base station to the first communication terminal.

6. The communication system according to claim 1, wherein the second base station selects a communication terminal to which a transmission signal with a weakest interference for the first communication terminal is transmitted from the second base station among a plurality of communication terminals located in a cell of the second base station, as the second communication terminal.

7. The communication system according to claim 6, wherein the second base station selects the second communication terminal based on location information on the plurality of communication terminals located in the cell of the second base station.

8. The communication system according to claim 1, wherein the second base station acquires a value of a second interference suppression parameter to be applied to a third transmission signal from the second base station so as to suppress an interference from the first base station in the second communication terminal, when the second communication terminal is located in the cell border area, wherein the first base station duplicates a second desired data for the first communication terminal, and transmits the duplicated second desired data to the second base station via the inter-base station communication interface, and wherein the second base station generates the third transmission signal by applying the value of the second interference suppression parameter to a second desired data for the second communication terminal and the second desired data for the first communication terminal received from the first base station.

9. The communication system according to claim 8, wherein the second base station calculates and acquires the value of the second interference suppression parameter used in the second base station based on quality information on a radio signal received from the second communication terminal.

10. The communication system according to claim 8, wherein the second communication terminal calculates the second interference suppression parameter based on quality information on a radio signal received by the second communication terminal itself, and transmits the calculated second interference suppression parameter to the second base station.

11. The communication system according to claim 8, wherein the first base station:

receives second quality information on a radio signal received from the second communication terminal, from the second base station via the inter-base station communication interface;

calculates a value of the first interference suppression parameter and the second interference suppression parameter based on first quality information on the radio signal received from the first communication terminal and the second quality information on the radio signal received from the second base station; and transmits the value of the second interference suppression parameter to the second base station via the inter-base station communication interface, and wherein the second base station:

transmits the second quality information received from the second communication terminal to the first base station via the inter-base station communication interface; and receives the value of the second interference suppression parameter from the first base station via the inter-base station communication interface.

12. The communication system according to claim 8, wherein the second base station:

receives the first quality information on a radio signal received from the first communication terminal, from the first base station via the inter-base station communication interface;

calculates a value of the first interference suppression parameter and the second interference suppression parameter based on second quality information on a radio signal received from the second communication terminal and the first quality information; and transmits the value of the first interference suppression parameter to the first base station via the inter-base station communication interface, and wherein the first base station:

transmits the first quality information to the second base station via the inter-base station communication interface; and receives the value of the first interference suppression parameter from the second base station via the inter-base station communication interface.

13. The communication system according to claim 1, wherein the first base station calculates and acquires the value of the first interference suppression parameter used in the first base station based on quality information on a radio signal received from the first communication terminal.

14. The communication system according to claim 1,
wherein the first communication terminal calculates the first interference suppression parameter based on quality information on a radio signal received by the first communication terminal itself, and transmits the first calculated interference suppression parameter to the first base station.

15. The communication system according to claim 1,
wherein each of the first base station and the second base station performs the cooperative transmission with a MIMO (Multi Input Multi Output) transmission system that uses a plurality of antennas, and
wherein the first interference suppression parameter is a transmission weight.

16. The communication system according to claim 1,
wherein the first base station, when determining that the first communication terminal is located in the cell border area based on first quality information on a radio communication received from the communication terminal located in the cell of the first base station, determines a start of the data cooperative transmission for the first communication terminal and the second communication terminal, and transmits a cooperative transmission start request for requiring the cooperative transmission of the data to the second base station via the inter-base station communication interface.

17. A base station of any one of a plurality of base stations in a communication system capable of cooperatively transmitting a data from the plurality of base stations by radio communication,
wherein the base station comprises:
means of acquiring a value of an interference suppression parameter that is applied to a transmission signal from the base station so as to suppress an interference from an other base station in a first communication terminal, when the first communication terminal having the base station as a desired station is located in a cell border area between an own cell of the base station and a cell of another base station that performs a cooperative transmission of the data;
means of generating a transmission signal by applying the value of the interference suppression parameter to a desired data for the first communication terminal and a desired data for a second communication terminal located in the cell of the other base station which is received from the other base station; and
means of cooperatively transmitting the generated transmission signal according to a predetermined data cooperative transmission timing.

18. The base station according to claim 17,
wherein the base station comprises means of duplicating the desired data for the first communication terminal and transmitting the duplicated desired data to the other base station via inter-base station communication interface.

19. A base station of any one of a plurality of base stations in a communication system capable of cooperatively transmitting data from the plurality of base stations by radio communication,
wherein the base station comprises:
means of duplicating a first desired data for a second communication terminal having the base station as a desired station located in an own cell and transmitting the duplicated desired data to an other base station performing a cooperative transmission of the data via inter-base station communication interface;
means of generating a first transmission signal of the first desired data for the second communication terminal; and
means of cooperatively transmitting the generated first transmission signal according to a predetermined data cooperative transmission timing.

20. The base station according to claim 19, further comprising:
means of acquiring a value of an interference suppression parameter that is applied to a transmission signal from the base station so as to suppress an interference from the other base station in the second communication terminal, when the second communication terminal is located in a cell border area between the own cell and a cell of the other base station; and
means of generating the second transmission signal by applying the value of the interference suppression parameter to a second desired data for the second communication terminal and a first desired data received from the other base station for a first communication terminal having the other base station as a desired station.

21. A communication control method when cooperatively transmitting a data from a first base station and a second base station by radio communication, the method comprising:
acquiring a value of a first interference suppression parameter that is applied to a first transmission signal from the first base station so as to suppress an interference from the second base station in a first communication terminal, by the first base station, when the first communication terminal having the first base station as a desired station is located in a cell border area between a cell of the first base station and a cell of the second base station;
duplicating a first desired data for a second communication terminal having the second base station as a desired station located in the cell of the second base station, and transmitting the duplicated first desired data to the first base station via inter-base station communication interface, by the second base station;
generating the first transmission signal by applying the value of the first interference suppression parameter to a desired data for the first communication terminal and the first desired data for the second communication terminal received from the second base station, by the first base station;
generating a second transmission signal of the desired data for the second communication terminal, by the second base station; and
cooperatively transmitting the first generated transmission signal and the second generated transmission signal according to a predetermined data cooperative transmission timing by the first base station and the second base station, respectively.

22. The communication control method according to claim 21, comprising:
acquiring a value of a second interference suppression parameter that is applied to a third transmission signal from the second base station so as to suppress an interference from the first base station in the second communication terminal, by the second base station, when the second communication terminal is located in the cell border area;

duplicating a second desired data for the first communication terminal, and transmitting the duplicated second desired data for the first communication terminal to the second base station via the inter-base station communication interface, by the first base station; and generating the third transmission signal by applying the value of the second interference suppression parameter to the second desired data for the second communication terminal and the second desired data for the first communication terminal received from the first base station, by the second base station.

\* \* \* \* \*